US007979905B2

(12) United States Patent
Kameda

(10) Patent No.: US 7,979,905 B2
(45) Date of Patent: Jul. 12, 2011

(54) STORAGE SYSTEM, VIRUS INFECTION SPREADING PREVENTION METHOD, AND VIRUS REMOVAL SUPPORT METHOD

(75) Inventor: Masami Kameda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1196 days.

(21) Appl. No.: 11/701,470

(22) Filed: Feb. 2, 2007

(65) Prior Publication Data

US 2008/0134335 A1 Jun. 5, 2008

(30) Foreign Application Priority Data

Dec. 5, 2006 (JP) ................................ 2006-328060

(51) Int. Cl.
  *H04L 29/14* (2006.01)
  *G06F 21/24* (2006.01)
(52) U.S. Cl. ......................................... 726/24; 713/188
(58) Field of Classification Search .................. 720/719; 726/22–26; 713/193–194
  See application file for complete search history.

(56) References Cited

U.S. PATENT DOCUMENTS

| 5,483,649 | A  | * | 1/1996  | Kuznetsov et al. ............. 726/22 |
| 6,647,400 | B1 | * | 11/2003 | Moran ................................. 1/1 |
| 7,240,241 | B2 | * | 7/2007  | Oka ................................ 714/19 |
| 2003/0037187 | A1 | * | 2/2003 | Hinton et al. ..................... 710/1 |
| 2004/0010732 | A1 |   | 1/2004 | Oka |
| 2005/0144475 | A1 | * | 6/2005 | Sakaki et al. ................. 713/200 |
| 2005/0154937 | A1 | * | 7/2005 | Achiwa ............................. 714/6 |
| 2006/0031468 | A1 | * | 2/2006 | Atluri et al. ................... 709/224 |
| 2006/0069865 | A1 | * | 3/2006 | Kawamura et al. ........... 711/114 |
| 2006/0137010 | A1 | * | 6/2006 | Kramer et al. ................. 726/22 |

FOREIGN PATENT DOCUMENTS

JP        2004-46435        7/2002

* cited by examiner

*Primary Examiner* — Minh Dinh
*Assistant Examiner* — Venkat Perungavoor
(74) *Attorney, Agent, or Firm* — Foley & Lardner LLP

(57) ABSTRACT

In order to provide a storage system, virus infection spreading prevention method, and virus removal support method capable of performing an operation to prevent spreading of a virus infection and an operation to remove a virus straightforward, at an operation host, a virus check is executed for volumes, infection state information is sent to a management host according to detection results when a virus infection is detected, and at a management host, predetermined processing is executed in order to put the state of the path with the volume infected with a virus offline based on the infected state information. Further, at the operation host, a virus check is executed for the volumes, and when a virus infection is detected, infection state information is sent to the management host according to the results of the detection. At the management host, the range of influence of the virus infection is specified, the state after removal of the virus from the necessary volumes existing within the range of influence is predicted, and results of the prediction are displayed on a screen.

8 Claims, 34 Drawing Sheets

FIG.3

| DRIVE | STORAGE APPARATUS ID | Vol_ID |
|---|---|---|
| C : | S1 | X |
|  |  |  |

| STORAGE APPARATUS ID | PVol_ID | RESTORE TIME/Vol | INFECTED STATE 25D ||| 
|---|---|---|---|---|---|
| | | | VIRUS NAME | INFECTION TIME | REMOVAL TIME |
| S1 | X | | Warm | 9:00 | |
| | | | | | |

| STORAGE APPARATUS ID | PVol_ID | RESTORE TIME/Vol | INFECTED STATE 33D | | | SVol_ID | COPY TIME | INFECTED STATE FLAG |
|---|---|---|---|---|---|---|---|---|
| | | | VIRUS NAME | INFECTION TIME | REMOVAL TIME | | | |
| S1 | X | - | Warm | 9:00 | - | Y0 | 12:00 | 1 |
| S1 | X | - | - | - | - | Y1 | 10:00 | 1 |
| S1 | X | - | - | - | - | Y2 | 8:00 | 0 |
| S2 | Z | - | Warm | 9:30 | - | - | - | - |

| HOST | STORAGE APPARATUS ID | Vol_ID | PATH STATE 34D | | |
|---|---|---|---|---|---|
| | | | STATE | Offline TIME | Online TIME |
| AP1 | S1 | X | | | |
| AP2 | S1 | X | | | |
| AP2 | S2 | Z | | | |

| OPERATION HOST | Vol_ID | VIRUS NAME | INFECTION TIME | REMOVAL TIME |
|---|---|---|---|---|
|  | X | Warm | 9:00 |  |

FIG.11B

| OPERATION HOST | Vol_ID | VIRUS NAME | INFECTION TIME | REMOVAL TIME |
|---|---|---|---|---|
|  | X | Warm | - | 13:00 |
|  | Y0 | Warm |  | 13:05 |
|  | Y1 | Warm |  | 13:10 |

FIG.15

| INSTRUCTION TYPE | OPERATION HOST | EXTERNAL STORAGE APPARATUS ID | Vol_ID |
|---|---|---|---|
| Offline | AP1 | S1 | X |

FIG.17

| INSTRUCTION TYPE | EXTERNAL STORAGE APPARATUS ID | OPERATION HOST | TARGET Vol_ID | OPPOSING Vol_ID |
|---|---|---|---|---|
| DISCONNECT PAIR | S1 | AP1 | X | Y0 |

FIG.19

| INSTRUCTION TYPE | Vol_ID | EXTERNAL STORAGE APPARATUS ID |
|---|---|---|
| VIRUS CHECK | Z | S2 |

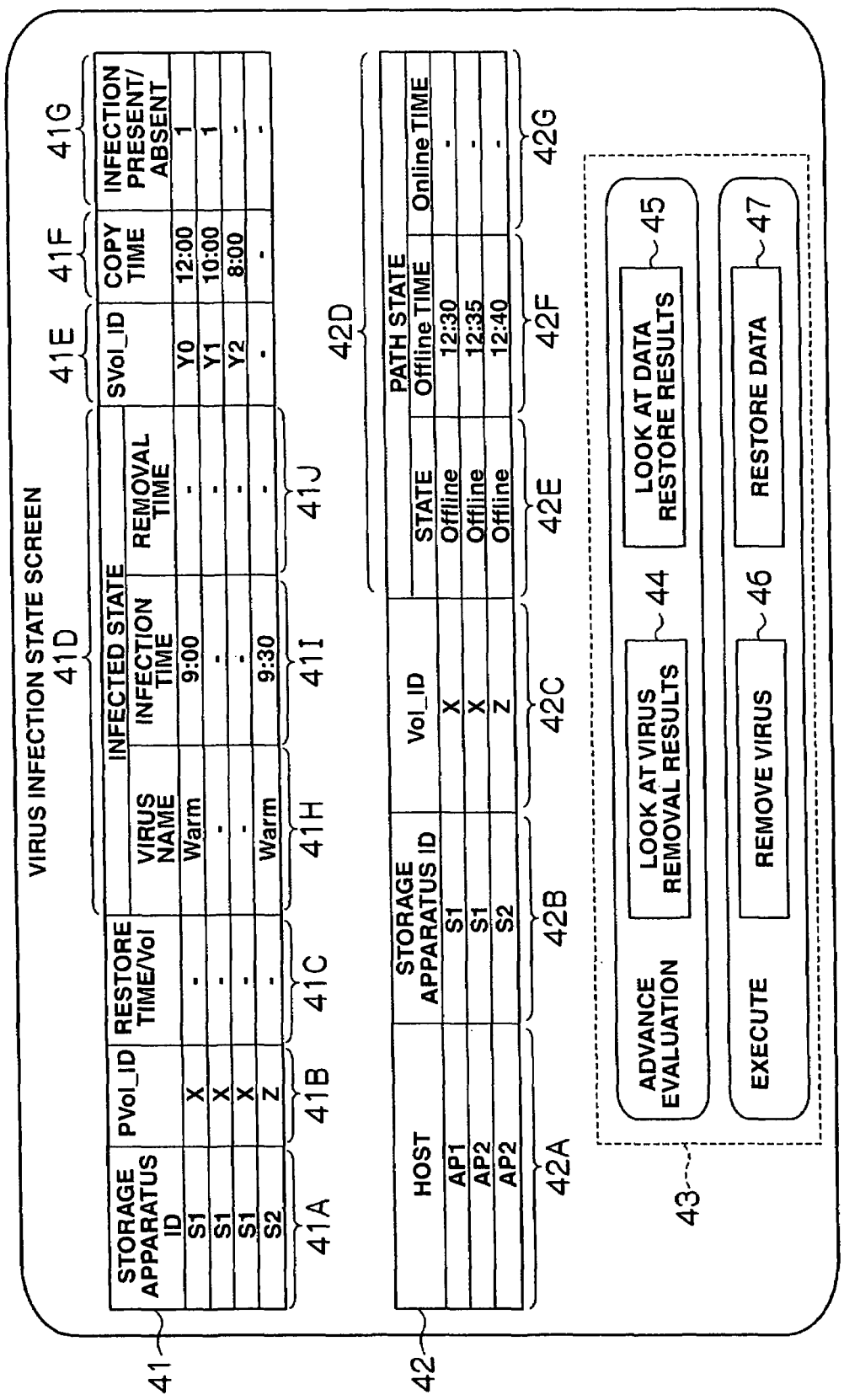

FIG.22

VIRUS INFECTION STATE SCREEN (41)

| STORAGE APPARATUS ID | PVol_ID | RESTORE TIME /Vol | INFECTED STATE | | | SVol_ID | COPY TIME | INFECTION PRESENT/ABSENT |
|---|---|---|---|---|---|---|---|---|
| | | | VIRUS NAME | INFECTION TIME | REMOVAL TIME | | | |
| S1 | X | - | Warm | 9:00 | 9:00 | Y0 | 12:00 | 1 |
| S1 | X | - | - | - | - | Y1 | 10:00 | 1 |
| S1 | X | - | - | - | - | Y2 | 8:00 | - |
| S2 | Z | - | Warm | 9:30 | 9:30 | - | - | - |

41A 41B 41C 41H 41I 41J 41E 41F 41G (42)

| HOST | STORAGE APPARATUS ID | Vol_ID | PATH STATE | | |
|---|---|---|---|---|---|
| | | | STATE | Offline TIME | Online TIME |
| AP1 | S1 | X | Offline | 12:30 | - |
| AP2 | S1 | X | Offline | 12:35 | - |
| AP2 | S2 | Z | Offline | 12:40 | - |

42A 42B 42C 42E 42E 42G

ADVANCE EVALUATION - PREDICTED RESULTS FOR THE CASE OF REMOVING VIRUS

(50) (50D)

| STORAGE APPARATUS ID | PVol_ID | RESTORE TIME /Vol | INFECTED STATE | | | SVol_ID | COPY TIME | INFECTED STATE |
|---|---|---|---|---|---|---|---|---|
| | | | VIRUS NAME | INFECTION TIME | REMOVAL TIME | | | |
| S1 | X | - | Warm | - | 50 minutes | Y0 | 12:00 | - |
| S1 | X | - | - | - | - | Y1 | 10:00 | - |
| S1 | X | - | - | - | - | Y2 | 8:00 | - |
| S2 | Z | - | Warm | - | 30 minutes | - | - | - |

50A 50B 50C 50H 50I 50J 50E 50F 50G

43:
- ADVANCE EVALUATION: LOOK AT VIRUS REMOVAL RESULTS (44) | LOOK AT DATA RESTORE RESULTS (45)
- EXECUTE: REMOVE VIRUS (46) | RESTORE DATA (47)

FIG.23

VIRUS INFECTION STATE SCREEN

Table 41:

| STORAGE APPARATUS ID | PVol_ID | RESTORE TIME /Vol | INFECTED STATE - VIRUS NAME | INFECTED STATE - INFECTION TIME | INFECTED STATE - REMOVAL TIME | SVol_ID | COPY TIME | INFECTION PRESENT/ ABSENT |
|---|---|---|---|---|---|---|---|---|
| S1 | X | - | Warm | 9:00 | 9:00 | Y0 | 12:00 | 1 |
| S1 | X | - | - | - | - | Y1 | 10:00 | 1 |
| S1 | X | - | - | - | - | Y2 | 8:00 | - |
| S2 | Z | - | Warm | 9:30 | 9:30 | - | - | - |

41A 41B 41C 41H 41I 41J 41E 41F 41G

Table 42:

| HOST | STORAGE APPARATUS ID | Vol_ID | PATH STATE - STATE | Offline TIME | Online TIME |
|---|---|---|---|---|---|
| AP1 | S1 | X | Offline | 12:30 | - |
| AP2 | S1 | X | Offline | 12:35 | - |
| AP2 | S2 | Z | Offline | 12:40 | - |

42A 42B 42C 42E 42E 42G

ADVANCE EVALUATION - PREDICTED RESULTS FOR THE CASE OF REMOVING VIRUS

Table 50:

| STORAGE APPARATUS ID | PVol_ID | RESTORE TIME /Vol | INFECTED STATE - VIRUS NAME | INFECTED STATE - INFECTION TIME | INFECTED STATE - REMOVAL TIME | SVol_ID | COPY TIME | INFECTED STATE |
|---|---|---|---|---|---|---|---|---|
| S1 | X | - | Warm | - | 50 minutes | Y0 | 12:00 | - |
| S1 | X | - | - | - | - | Y1 | 10:00 | - |
| S1 | X | - | - | - | - | Y2 | 8:00 | - |
| S2 | Z | - | Warm | - | 30 minutes | - | - | - |

50A 50B 50C 50H 50I 50J 50E 50F 50G

ADVANCE EVALUATION - PREDICTED RESULTS FOR THE CASE OF RESTORING DATA

Table 51 (51D spans INFECTED STATE columns):

| STORAGE APPARATUS ID | PVol_ID | REQUIRED RESTORE TIME/Vol | INFECTED STATE - VIRUS NAME | INFECTED STATE - INFECTION TIME | INFECTED STATE - REMOVAL TIME | SVol_ID | COPY TIME | REQUIRED COPY TIME | INFECTION PRESENT/ ABSENT |
|---|---|---|---|---|---|---|---|---|---|
| S1 | X | 30minutes/Y2 | Warm | - | - | Y0 | - | 5 minutes | - |
| S1 | X | - | - | - | - | Y1(Deleted) | - | - | - |
| S1 | X | - | - | - | - | Y2 | 8:00 | - | - |
| S2 | Z | - | Warm | - | 30 minutes | - | - | - | - |

51A 51B 51C 51H 51I 51J 51E 51F 51K 51G

43: ADVANCE EVALUATION — LOOK AT VIRUS REMOVAL RESULTS (44), LOOK AT DATA RESTORE RESULTS (45)

EXECUTE — REMOVE VIRUS (46), RESTORE DATA (47)

FIG.24

VIRUS INFECTION STATE SCREEN - NO VIRUS INFECTION

| STORAGE APPARATUS ID | PVol_ID | RESTORE TIME/Vol | INFECTED STATE ||| SVol_ID | COPY TIME | INFECTION PRESENT/ ABSENT |
| | | | VIRUS NAME | INFECTION TIME | REMOVAL TIME | | | |
|---|---|---|---|---|---|---|---|---|
| S1 | X | - | Warm | - | 13:00 | Y0 | 12:00 | - |
| S1 | X | - | - | - | - | Y1 | 10:00 | - |
| S1 | X | - | - | - | - | Y2 | 8:00 | - |
| S2 | Z | - | Warm | - | 13:10 | | | - |
| 61A | 61B | 61C | 61H | 61I | 61J | 61E | 61F | 61G |

61

| HOST | STORAGE APPARATUS ID | Vol_ID | | STATE | PATH STATE ||
| | | | | | Offline TIME | Online TIME |
|---|---|---|---|---|---|---|
| AP1 | S1 | X | ☑ | Offline | 12:30 | - |
| AP2 | S1 | X | ☑ | Offline | 12:35 | - |
| AP2 | S2 | Z | ☐ | Offline | 12:40 | - |
| 62A | 62B | 62C | 62H | 62E | 62F | 62G |

62

[ PUT PATH Online ] 63

VIRUS INFECTION STATE SCREEN - NO VIRUS INFECTION

| STORAGE APPARATUS ID | PVol_ID | RESTORE TIME/Vol | VIRUS NAME | INFECTED STATE | | SVol_ID | COPY TIME | INFECTION PRESENT/ ABSENT |
|---|---|---|---|---|---|---|---|---|
| | | | | INFECTION TIME | REMOVAL TIME | | | |
| S1 | X | - | Warm | - | 13:00 | Y0 | 12:00 | - |
| S1 | X | - | - | - | - | Y1 | 10:00 | - |
| S1 | X | - | - | - | - | Y2 | 8:00 | - |
| S2 | Z | - | Warm | - | 13:10 | | | |
| 61A | 61B | 61C | 61H | 61I | 61J | 61E | 61F | 61G |

61

| HOST | STORAGE APPARATUS ID | Vol_ID | | STATE | PATH STATE | |
|---|---|---|---|---|---|---|
| | | | | | Offline TIME | Online TIME |
| AP1 | S1 | X | ☑ | Online | - | 13:20 |
| AP2 | S1 | X | ☑ | Online | - | 13:20 |
| AP2 | S2 | Z | ☐ | Offline | 12:40 | - |
| 62A | 62B | 62C | 62H | 62E | 62F | 62G |

62

[ PUT PATH Online ] 63

VIRUS INFECTION STATE SCREEN - NO VIRUS INFECTION

| STORAGE APPARATUS ID | PVol_ID | RESTORE TIME/Vol | VIRUS NAME | INFECTED STATE | | SVol_ID | COPY TIME | INFECTION PRESENT/ ABSENT |
|---|---|---|---|---|---|---|---|---|
| | | | | INFECTION TIME | REMOVAL TIME | | | |
| S1 | X | 12:40/Y2 | Warm | - | - | Y0 | 12:45 | - |
| S1 | X | - | - | - | - | Y1 (Deleted) | - | - |
| S1 | X | - | Warm | - | 30 minutes | Y2 | 8:00 | - |
| S2 | Z | - | - | - | - | - | - | - |

71A 71B 71C 71H 71I 71J 71E 71F 71G

71

| HOST | STORAGE APPARATUS ID | Vol_ID | PATH STATE | | |
|---|---|---|---|---|---|
| | | | STATE | Offline TIME | Online TIME |
| AP1 | S1 | X | ☑ Offline | 12:30 | - |
| AP2 | S1 | X | ☑ Offline | 12:35 | - |
| AP2 | S2 | Z | ☐ Offline | 12:40 | - |

72A 72B 72C 72H 72E 72F 72G

[ PUT PATH Online ] ~73

VIRUS INFECTION STATE SCREEN - NO VIRUS INFECTION

| STORAGE APPARATUS ID | PVol_ID | RESTORE TIME/Vol | VIRUS NAME | INFECTED STATE | | REMOVAL TIME | SVol_ID | COPY TIME | INFECTION PRESENT/ ABSENT |
|---|---|---|---|---|---|---|---|---|---|
| | | | | INFECTION TIME | | | | | |
| S1 | X | 12:40/Y2 | Warm | - | | - | Y0 | 12:45 | - |
| S1 | X | - | - | - | | - | Y1(Deleted) | - | - |
| S1 | X | - | - | - | | - | Y2 | 8:00 | - |
| S2 | Z | - | Warm | - | | 30 minutes | - | - | - |

71A 71B 71C 71H 71I 71J 71E 71F 71G

| HOST | STORAGE APPARATUS ID | Vol_ID | STATE | PATH STATE | |
|---|---|---|---|---|---|
| | | | | Offline TIME | Online TIME |
| AP1 | S1 | X | Online ☒ | - | 13:20 |
| AP2 | S1 | X | Online ☒ | - | 13:20 |
| AP2 | S2 | Z | Offline ☐ | 12:40 | - |

72A 72B 72C 72E 72H 72F 72G

PUT PATH Online ~73

70
71
72

| INSTRUCTION TYPE | Vol_ID | EXTERNAL STORAGE APPARATUS ID |
|---|---|---|
| VIRTUAL VIRUS CHECK | Z | S2 |

| INSTRUCTION TYPE | EXTERNAL STORAGE APPARATUS ID | RESTORE Vol | BACK-UP Vol | COPY SOURCE Vol | COPY DESTINATION Vol |
|---|---|---|---|---|---|
| VIRTUAL RESTORE | S1 | X | Y2 | X | Y0 |

FIG.38A

| INSTRUCTION TYPE | EXTERNAL STORAGE APPARATUS ID | RESTORE Vol | BACK-UP Vol | COPY SOURCE Vol | COPY DESTINATION Vol | DELETE Vol |
|---|---|---|---|---|---|---|
| RESTORE | S1 | X | Y2 | | | |

FIG.38B

| INSTRUCTION TYPE | EXTERNAL STORAGE APPARATUS ID | RESTORE Vol | BACK-UP Vol | COPY SOURCE Vol | COPY DESTINATION Vol | DELETE Vol |
|---|---|---|---|---|---|---|
| COPY | S1 | | | X | Y0 | |

FIG.38C

| INSTRUCTION TYPE | EXTERNAL STORAGE APPARATUS ID | RESTORE Vol | BACK-UP Vol | COPY SOURCE Vol | COPY DESTINATION Vol | DELETE Vol |
|---|---|---|---|---|---|---|
| DELETE | S1 | | | | | Y1 |

STORAGE SYSTEM, VIRUS INFECTION SPREADING PREVENTION METHOD, AND VIRUS REMOVAL SUPPORT METHOD

CROSS-REFERENCES TO RELATED APPLICATIONS

This application relates to and claims priority from Japanese Patent Application No. 2006-328060, filed on Dec. 5, 2006, the entire disclosure of which is incorporated herein by reference.

BACKGROUND

1. Field of the Invention

The present invention relates to a storage system, virus infection spreading prevention method, and virus removal assistance method, and is appropriate for application in, for example, a storage system for a distributed storage environment.

2. Description of Related Art

Storage systems copy and share storage resources between a number of operation hosts. In this kind of environment, in the event that a certain operation host is infected with a computer virus (in the following, this is simply referred to as "virus"), the virus may also influence copied data, backed-up data, and other operation hosts.

Technology is also proposed as technology for preventing this kind of spreading of a virus where, in the related art, in storage apparatus having a main volume (referred to as a "primary volume" in the following), duplicate volumes (hereinafter referred to as "secondary volumes") for this main volume, and back up volumes for backing up data of the secondary volumes, virus checking is implemented for secondary volumes during backing up of data stored on the secondary volumes to back up volumes (for example, refer to patent document 1).

[Patent Document 1] Japanese Patent Laid-open Publication No. 2004-46435.

SUMMARY

However, in the related art, in the event that any of the volumes are infected with a virus in a storage environment where storage resources are copied and shared between a number of operation hosts, in order to prevent the virus infection from spreading, a virus infection spreading prevention operation is required where it is necessary to switch over paths between the volumes and operation hosts to be offline, and in the event that a volume operates in cooperation with another volume (pair connection), it is necessary to stop this cooperation.

Further, at the storage system, in the event that any of the volumes are infected with a virus, in accompaniment with this operation, to prevent spreading of the virus infection, it is necessary to specify the range of influence of the virus infection, put corresponding paths online after deletion of the virus, and a restore operation to restart cooperation with other volumes is also necessary.

In this case, in the related art, these kinds of series of operations are all carried out using manual operations. However, it is difficult to specify a range of influence of a virus in a storage environment where storage resources are duplicated and shared between a number of operation hosts, and even if it is possible to specify the range of influence, the time and effort involved in putting all of the paths between the volumes and operation hosts present within this range offline and halting cooperation between volumes is problematic.

In order to take into consideration the points described above, the present invention sets out to provide a storage system, virus infection spreading prevention method, and virus removal support method capable of performing an operation to prevent spreading of a virus infection and an operation to remove a virus straightforward.

In order to resolve these problems, the present invention may be a storage system having an operation host, external storage apparatus providing volumes having storage regions for data to the operation host, and a management host for managing the operation host and the external storage apparatus, the operation host comprising a virus check section executing virus checks on the volumes periodically or irregularly, and a first virus infected state management section for sending infected state information to the management host according to results of detection when the virus check section detects that the volume is infected with a virus, and the management host comprising a second virus infected state management section executing predetermined processing to put the state of a path with the volume infected with a virus offline based on infected state information when the infected state information is received from the operation host.

Further, the present invention may also be a virus infection spreading prevention method for a storage system having an operation host, external storage apparatus providing volumes having storage regions for data to the operation host, and a management host for managing the operation host and the external storage apparatus, comprising a first step of executing a virus check on the volume periodically or irregularly at the operation host, a second step of sending infected state information to the management host according to results of detection when a virus infection is detected for the volume at the operation host, and a third step of executing predetermined processing in order to put the state of a path with the volume infected with a virus offline based on the infected state information at the management host.

The present invention can also be a storage system having an operation host, external storage apparatus providing volumes having storage regions for data to the operation host, and a management host for managing the operation host and the external storage apparatus, the operation host comprising a virus check section executing virus checks on the volumes periodically or irregularly, and a first virus infected state management section for sending infected state information to the management host according to results of detection when the virus check section detects that the volume is infected with a virus, and the management host comprising a storage holding section for holding in storage cooperation information that is information relating to cooperation between the volumes, and correlation information that is information relating to correlation between operation hosts and the volumes, and a second virus infected state management section for specifying a range of influence of virus infection based on the cooperation information and the correlation information when the infected state information is received from the operation host, predicting a state after removal of a virus from required volumes within the range of influence, and displaying a predicted results screen based on the predicted results.

Moreover, the present invention may also be a virus removal support method for a storage system having an operation host, external storage apparatus providing volumes having storage regions for data to the operation host, and a management host for managing the operation host and the external storage apparatus, comprising a first step of executing a virus check on the volume periodically or irregularly at the operation host, a second step of sending infected state information to the management host according to results of detection when a virus infection is detected for the volume at the operation host, and a third step of, at the management host, when the infected state information is received from the operation host, specifying a range of influence of a virus infection based on cooperation information that is information relating to cooperation between the volumes held in storage in advance, predicting a state after removal of the virus from the necessary volumes existing within the range of influence, and displaying predicted results on a screen based on the predicted results.

According to the present invention, it is possible to simplify a virus infection spreading prevention operation and virus removal operation.

BRIEF DESCRIPTION OF THE DRAWINGS

FIG. 3 is an outline view illustrating a drive-volume management table;

FIG. 4 is an outline view illustrating an infected volume management table;

FIG. 5 is an outline view illustrating an infected volume cooperation state management table;

FIG. 6 is an outline view illustrating a host-storage apparatus management table;

FIGS. 11 (A) and (B) are outline views showing a transmission format for infection state information;

FIG. 15 is an outline view illustrating a path control command;

FIG. 17 is an outline view illustrating a volume pair/mount control command;

FIG. 19 is an outline view illustrating a virus check/removal command;

FIG. 20 is an outline view illustrating a virus infection state screen;

FIG. 22 is another outline view illustrating a virus infection state screen;

FIG. 23 is still another outline view illustrating a virus infection state screen;

FIG. 24 is an outline view illustrating a virus removal results screen;

FIG. 25 is a further outline view illustrating a virus removal results screen;

FIG. 26 is a further outline view illustrating a restore results screen;

FIG. 27 is another outline view illustrating a restore results screen;

FIG. 38 is an outline view where FIG. 38(A) illustrates a restore command, FIG. 38(B) illustrates a copy command, and FIG. 38(C) illustrates a volume removal command.

DETAILED DESCRIPTION OF PREFERRED EMBODIMENTS

The following is a description with reference to the drawings below of a first embodiment of the present invention.

(1) Configuration of Storage System of this Embodiment

Figure 1:
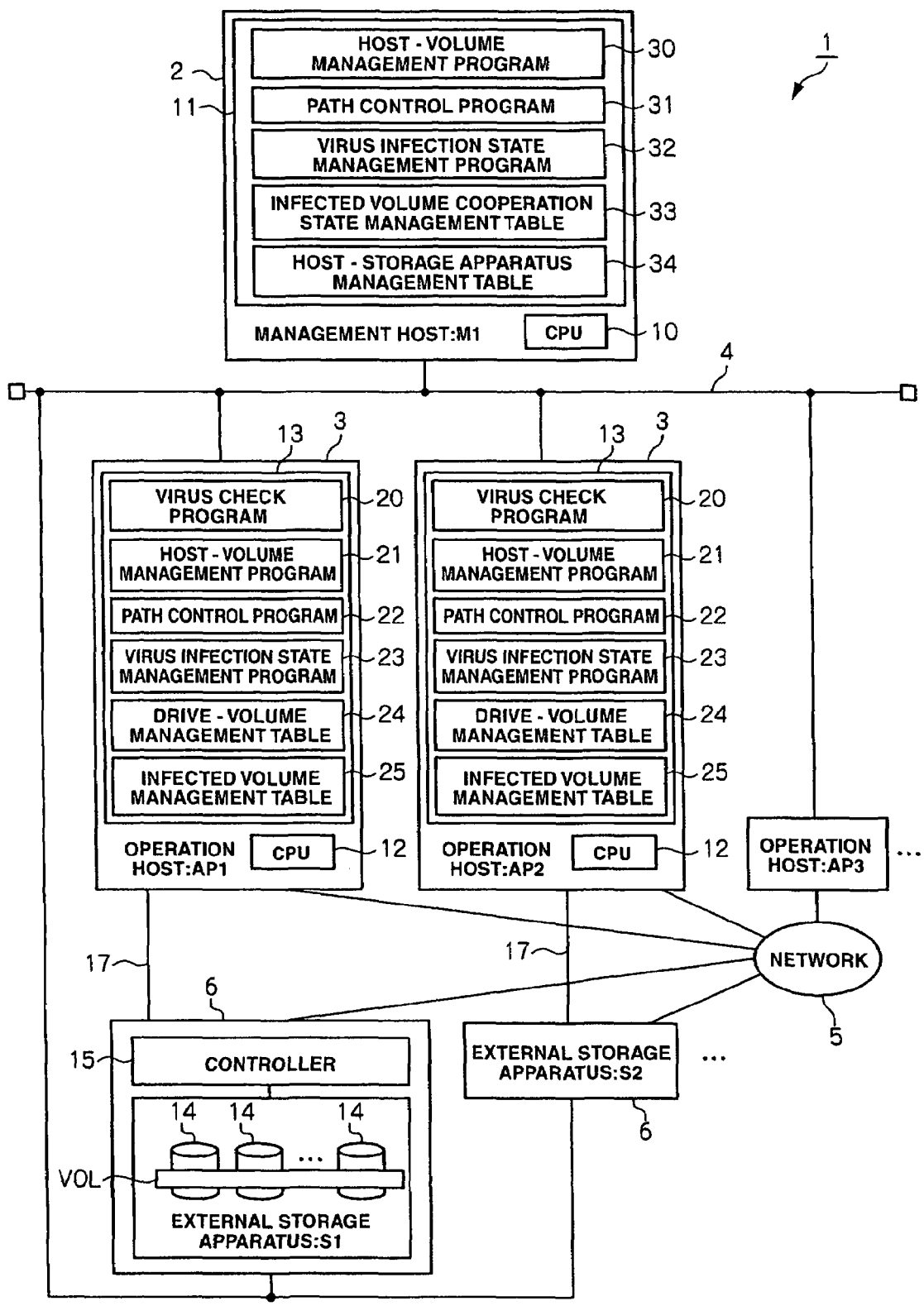
FIG. 1 is a block view showing an outline of an overall configuration for a storage system of this embodiment.

In FIG. 1, numeral 1 indicates the whole of a storage system of this embodiment. This storage system 1 is such that a management host 2 and number of operation hosts 3 are connected via a first network 4, and each operation host 3 is connected to one or a number of external storage apparatus 6 via a second network 5.

The management host 2 is computer apparatus for correlating and managing the operation hosts 3 and the external storage apparatus 6, and is equipped with a CPU (Central Processing Unit) 10 and memory 11, etc. The CPU 10 is a processor for controlling the overall operation of the management host 2, with various processing being carried out for the management host overall as a result of this CPU 10 executing each of the various control programs stored in the memory 11.

Each operation host 3 is computer apparatus for executing each of the various operation applications and is provided with a CPU 12 and memory 13, etc. The CPU 12 carries out each of the various processing for the operation host 3 as a whole by executing each of the various control programs stored in the memory 13.

The first network 4 is configured from, for example, a LAN (Local Area Network), Internet, public line, or dedicated line, etc. Communication between the management host 2, operation hosts 3 and external storage apparatus 6 via this first network 4 is carried out in accordance with, for example, the TCP/IP (Transmission Control Protocol/Internet Protocol) protocol. Further, the second network 5 is, for example, configured from a SAN (Storage Area Network). Communication between the operation hosts 3 and external storage apparatus 6 via this second network 5 is carried out in accordance with, for example, fiber channel protocol.

The external storage apparatus 6 is configured from a plurality of storage devices 14, and a controller 15 for controlling the storage devices 14.

The storage device 14 is, for example, an expensive disc drive such as, for example, an FC (Fiber Channel) disc etc., a low cost disc drive such as a SATA (Serial AT Attachment) disc or optical disc drive, or a semiconductor memory, etc. One RAID (Redundant Array of Inexpensive Disks) group is constituted by a predetermined number (for example, four) of storage devices 14, with one or a plurality of logical volumes VOL being defined on a storage region provided by each storage device constituting one RAID group. Data is then read and written to and from operation hosts 3 at the volumes VOL.

Respective unique identifiers (LUN: Logical Unit Number) are allocated to each volume VOL. In the case of this embodiment, the input and output of data is carried out by taking a combination of this identifier and a unique block number (LBA: Logical Block Address) allocated to each logical block as an address, and designating this address.

Figure 2:
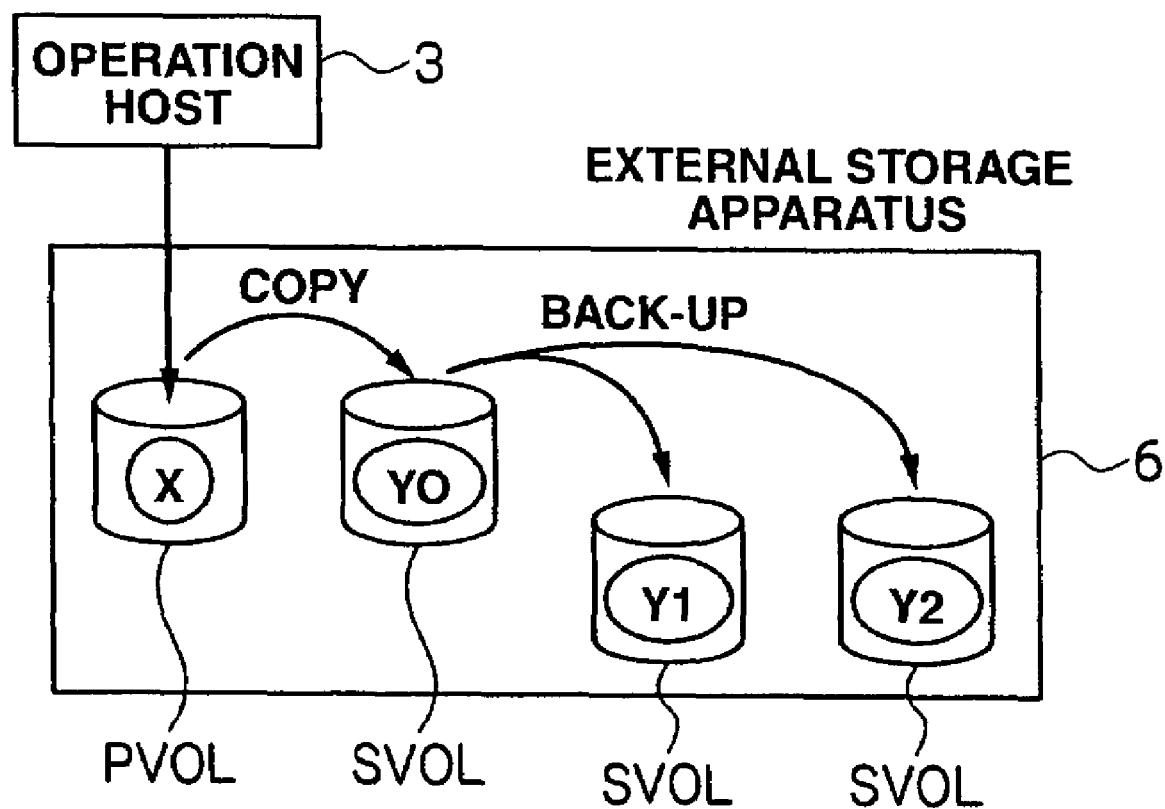
FIG. 2 is a conceptual view illustrating the type of volume set up within the storage system and the generations of the secondary volumes.

In the case of this embodiment, as shown in FIG. 2, a primary volume PVOL used when the operation host 2 reads and writes data and a secondary volume SVOL storing back up data for this primary volume PVOL exist as types of volume VOL defined within external storage apparatus 6. Further, a first generation secondary volume SVOL ("YO" in FIG. 2) that copies data written to the primary volume PVOL in real time and secondary volume SVOL ("Y1", "Y2" of FIG. 2) of a second generation onwards storing backup data for the secondary volume SVOL exist as the secondary volumes SVOL.

The controller 15 is equipped with a CPU and memory etc. The controller 51 executes control processing in order to read and write designated data to a designated primary volume PVOL according to a requests from operation hosts 3, copy data stored in the primary volume PVOL to a first generation secondary volume SVOL, or back up data stored in a first generation secondary volume SVOL to a secondary volume SVOL of a second generation or more.

Further, the controller 15 is connected to corresponding operation hosts via a dedicated path 17 separate from the second network 5, and various commands and information relating to a virus infection spreading prevention function and a virus removal support function described later are transmitted and received to and from the corresponding operation host 3 via this dedicated path 17.

(2) Virus Infection Spreading Prevention Function and Virus Removal Support Function (2-1) Configuration for Various Programs and Tables Relating to Aforementioned Functions Next, a description is given of the virus infection spreading prevention function and virus removal support function of this embodiment adopted in this storage system 1.

A first characteristic of the storage system 1 of this embodiment is that a virus spreading prevention function is mounted where the presence or absence of a virus infection for files stored in each primary volume PVOL used by the operation hosts 3 is monitored, and when a virus infection is confirmed, the management host 2 and operation hosts 3 operate in unison, and processing is executed to prevent this virus infection from spreading. In the following, files stored in a volume VOL having a virus infection may also be referred to as the "primary VOL being infected with a virus".

A second characteristic of the storage system 1 of this embodiment is that a virus removal support function is mounted where, when a virus infection is confirmed, the range of influence of this virus infection is displayed on a screen, two types of removal method of a virus removal using a virus removal tool function of a virus check program 20 described later installed at the operation hosts 3 and a restore using back-up data of primary volume PVOL saved in the secondary volume SVOL are provided as virus removal methods, and estimated results for the case of carrying out virus removal using these virus removal methods are instructed to a system administrator.

In the case of the storage system 1, as means for implementing these functions, the virus check program 20, host-volume management program 21, path control program 22, virus infection state management program 23, drive/volume management table 24, and infected volume management table 25 are stored in the memory 13 of the operation hosts 3, and a host-volume management program 30, path control program 31, virus infection state management program 32, infected volume cooperation state management table 33, and host/storage apparatus management table 34 are stored in the memory 11 of the management host 2.

Of these, the virus check program 20 of an operation host 3 is a program that functions as a virus removal tool that checks whether or not the volume VOL used by the operation host 3 is infected with a virus, and removes a virus when the volume VOL is infected with a virus. It is also possible to use a commercially available virus removal tool as this virus check program 20. In the case of this embodiment, each operation host 3 executes a virus check for the designated volume VOL either periodically or at an arbitrary timing designated by a user based on the respective virus check programs 20.

The host-volume management program 21 of the operation hosts 3 has a function for collecting together and managing volume ID's of the volumes VOL used by this operation host 3 and apparatus ID's of external storage apparatus 6 set to these volumes VOL, and a function for making pair connections between fellow volumes or disconnecting these pair connections, and controlling backing up or restoring (recovering) etc. volumes VOL. Further, host-volume management program 21 has a function for managing correlation between operation hosts 3 where the host-volume management program 21 is installed and volumes VOL used by the operation hosts 3. Each operation host 3 then manages which volume VOL they themselves used within which external storage apparatus 6 based on this host-volume management program 21.

Further, path control program 22 of the operation hosts 3 is a program for managing paths between the operation hosts 3 and the volumes VOL used by the operation hosts 3. Each operation host 3 executes processing to spread the load across a plurality of paths, switch paths at the time of a fault, and switch over paths between being online and offline based on this path control program 22.

Moreover, the virus infection state management program 23 of the operation hosts 3 is a program for managing virus infection states of the volumes VOL. Each operation host 3 executes various processing relating to the virus infection spreading prevention function and the virus removal support function based on the virus infection state management program 23.

On the other hand, the host-volume management program 30 of the management host 2 is a program having a function for managing correlation between operation hosts 3 and volumes VOL within the storage system 1 operating in cooperation with host-volume management program 21 of each operation host 3, and the path control program 31 of the management host 2 is a program having a function for across the board management of the paths within the storage system 1 operating in cooperation with path control programs 22 mounted at each of the respective operation hosts 3.

Further, virus infection state management program 32 of the management host 2 is a program for managing the virus infection state of the volumes VOL operating in cooperation with the virus infection state management program 23 of the operation hosts 3. Each management host 2 executes various processing relating to the virus infection spreading prevention function and the virus removal support function based on the virus infection state management program 32.

In the following, a description is given taking the main body of processing for each type of processing as a program in order to clearly articulate the processing content of the CPU 10 of the management host 2 and the CPU 12 of the operation hosts 3 based on each program but in reality the corresponding CPU 10 and CPU 12 cannot be said to carry out this processing based on the programs.

On the other hand, drive-volume management table 24 is a table made by the host-volume management program 21 of the operation hosts 3 for managing correlation between drive letters and external storage apparatus and the volume VOL (which drive letter can be allocated to which external storage apparatus, and which volume VOL is set at this external storage apparatus 6), and as shown in FIG. 3, is configured from "drive" column 24A, "storage apparatus ID" column 24B, and "VolID" column 24C.

Of these, a drive letter is stored in "drive" column 24A, and unique ID's (apparatus ID) assigned to external storage apparatus 6 allocated to this drive are stored in "storage apparatus ID" column 24B. Further, unique ID's (volume ID's) assigned to volumes VOL set at the external storage apparatus 6 are stored in "VolID" column 24C.

For example, in FIG. 3, it is shown that external storage apparatus 6 of "S1" are allocated to the "C:" drive of this operation host 3, and a volume VOL of "X" is set to within this external storage apparatus 6.

Further, infected volume management table 25 is a table made by the virus infection state management program 23 of the operation host 3 in order to manage the virus infection state of each primary volume PVOL used by the operation hosts 3 and as shown in FIG. 4, is configured from "storage apparatus ID" column 25A, "PVolID" column 25B, "restore time/Vol" column 25C, and "infected state" column 25D.

Of these, apparatus ID's for external storage apparatus 6 set at the corresponding primary volume PVOL are stored in the "storage apparatus ID" column 25A, and a volume ID of the primary volume PVOL is stored in "PVolID" column 25B. Further, when this primary volume PVOL is restored, this time, and a volume ID of a secondary volume SVOL storing the data used in the restoring are stored in the "restore time/Vol" column 25C.

A "infected state" column 25D, "virus name" column 25E, "infection time" column 25F, and "removal time" column 25G are also provided. When a file within a corresponding primary volume PVOL is then infected with a virus, the name of the virus, infection time, and the time of removal of the virus are stored in "virus name" column 25E, "infection time" column 25F, and "removal time" column 25G, respectively.

The infected volume cooperation state management table 33 is a table where the virus infection state management program 32 of the management host 2 manages the virus infection state of each of the primary volumes PVOL present within the storage system and manage the cooperation state between volumes VOL based on information collected from each operation host 3, and as shown in FIG. 5, is configured from "storage apparatus ID" column 33A, "PVolID" column 33B, "restore time/Vol" column 33C, "infected state" column 33D, "SVolID" column 33E, "copy time" column 33F, and "infection present/absent" column 33G.

Of these, corresponding information collected from each of the operation hosts 3 is stored in "storage apparatus ID" column 33A, "PVolID" column 33B, "restore time/Vol" column 33C, and "infected state" column 33D ("virus name" column 33H, "infection time" column 33I, and "removal time" column 33J). Namely, information stored in the "storage apparatus ID" column 25A, "PVolID" column 25B, "restore time/Vol" column 25C, and "infected state" column 25D respectively of the infected volume management table 25 (FIG. 4) of each operation host 3 is stored as a whole in the "storage apparatus ID" column 33A, "PVolID" column 33B, "restore time/Vol" column 33C, and "infected state" column 33D.

Further, a volume ID of the secondary volume SVOL backing up the data of the corresponding primary volume PVOL is stored in the "SVolID" column 33E, and the time of backing up data for the primary volume PVOL or the previous generation secondary volume SVOL finally is stored in this secondary volume SVOL in the "copy time" column 33F.

Moreover, an infection state flag ("1" at the time of infection, "0" when there is no infection) indicating whether or not a file stored in this primary volume PVOL is infected with a virus is stored in the "infection present/absent" column 33G.

Therefore, in the case in FIG. 5, data stored in the primary volume PVOL referred to as "X" set at the external storage apparatus 6 referred to as "S1" shows that at "12:00", "10:00" and "8:00", back up takes place to secondary volumes SVOL of "Y0", "Y1", and "Y2", respectively. Further, it can be confirmed from the infected volume cooperation state management table 33 that this primary volume PVOL has been infected with a virus "Worm" at "9:00", and that in accompaniment with this, data stored in secondary volumes referred to as "Y0" and "Y1" is also infected with this virus.

The host-storage apparatus management table 24 is a table made for the host-volume management program 30 of the management host 2 to manage correlation (the relationship between which operation host 3 uses which primary volume PVOL) between the operation hosts 3 and the primary volume PVOL based on information collected from each operation host 3, and path states between the operation hosts 3 and the primary volume PVOL, and as shown in FIG. 6, is configured from a "host" column 34A, "storage apparatus ID" column 34B, "VolID" column 34C, and "path state" column 34D.

A unique ID (host ID) assigned to the corresponding operation host 3 is stored in the "host" column 34A, a volume ID for the primary volume PVOL used by this operation host 3 is stored in the "VolID" column 34C, and an apparatus ID of the external storage apparatus 6 set by this primary volume PVOL is stored in the "storage apparatus ID" column 34B.

The "path state" column 34D is configured from a "path state" column 34D, "state" column 34E, "offline" column 34F, and "online" column 34G. Path connection states ("online" or "offline") for paths connecting respectively corresponding operation hosts and corresponding primary volumes PVOL, the time of going offline in the event that the path is offline, and the time of going online in the event of the path being online, are stored in the "state" column 34E, "offline" column 34F, and "online" column 34G.

Figure 7:
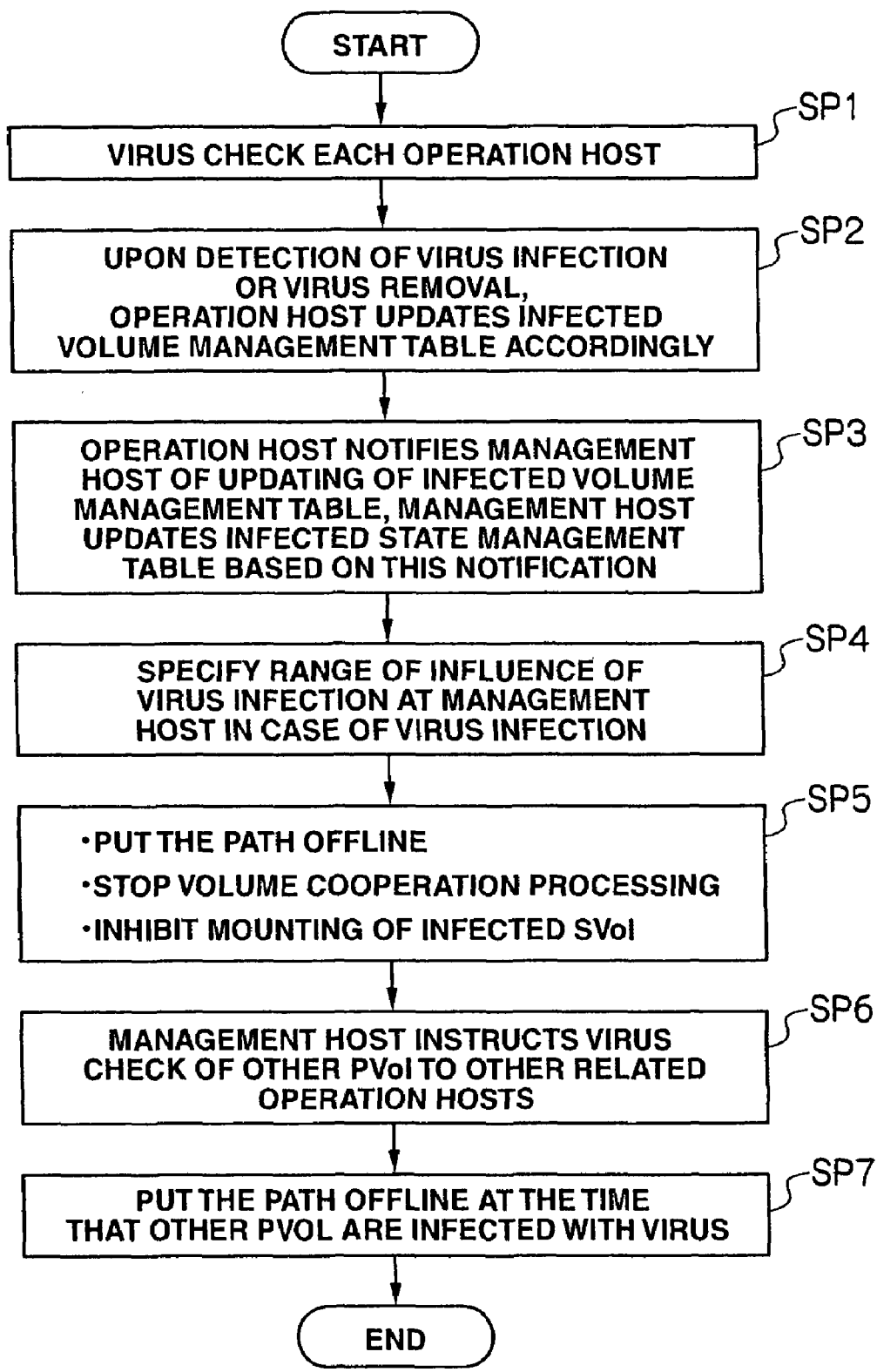
FIG. 7 is a flowchart showing an outline of the flow of processing relating to a virus infection spreading prevention function.

(2-2) Processing Relating to Virus Infection Spreading Prevention (2-2-1) Outline of Flow of Processing Relating to Virus Infection Spreading Prevention Function FIG. 7 shows an outline of a flow for processing occurring at the storage system 1 relating to the virus infection spreading prevention function.

At this storage system 1, the virus check program 20 of each operation host 3 periodically implements a virus check for each file within primary volumes PVOL used by the operation hosts 3, and the virus infection state management program 23 of the operation hosts 3 monitors the operation of the virus check program 20 by referring to a log (SP1).

When a virus infection state management program 23 of an operation host then detects that a file within any of the primary volumes PVOL used by the operation host 3 is infected with a virus or that virus removal for a primary volume PVOL infected with a virus is complete based on this log, the infected volume management table 25 is updated accordingly (SP2).

Further, when the infected volume management table 25 is updated in this manner, the virus infection state management program 23 of the operation host 3 notifies the virus infection state management program 32 of the management host 2 of the content of this update. Moreover, the virus infection state management program 32 of the management host 2 receiving this notification updates the infected volume cooperation state management table 33 in the same way as for the infected volume management table 25 described above based on this notification (SP3).

On the other hand, when it is recognized that any of the primary volumes PVOL has become infected with a virus based on this notification, the virus infection state management program 32 of the management host 2 specifies the range of influence of this virus infection based on the infected volume cooperation state management table 33 and the host-storage apparatus management table 34 (SP4).

Further, the virus infection state management program 32 of the management host 2 then changes the settings for the path between the primary volume PVOL infected with a virus and this operation host 3, and the settings for a path between the primary volume PVOL and other operation hosts 3 using the primary volume PVOL from online to offline. The virus infection state management program 32 ensures that the dedicated path 17 remains online. Further, the virus infection state management program 32 suppresses (separates pairings between primary volume PVOL and secondary volumes SVOL in such a manner that data of this primary volume PVOL is not backed up to secondary volumes SVOL) cooperation between this primary volume PVOL and the corresponding secondary volumes SVOL, and controls the external storage apparatus 6 in such a manner that secondary volumes SVOL infected with a virus are not mounted (SP5).

Figure 8:
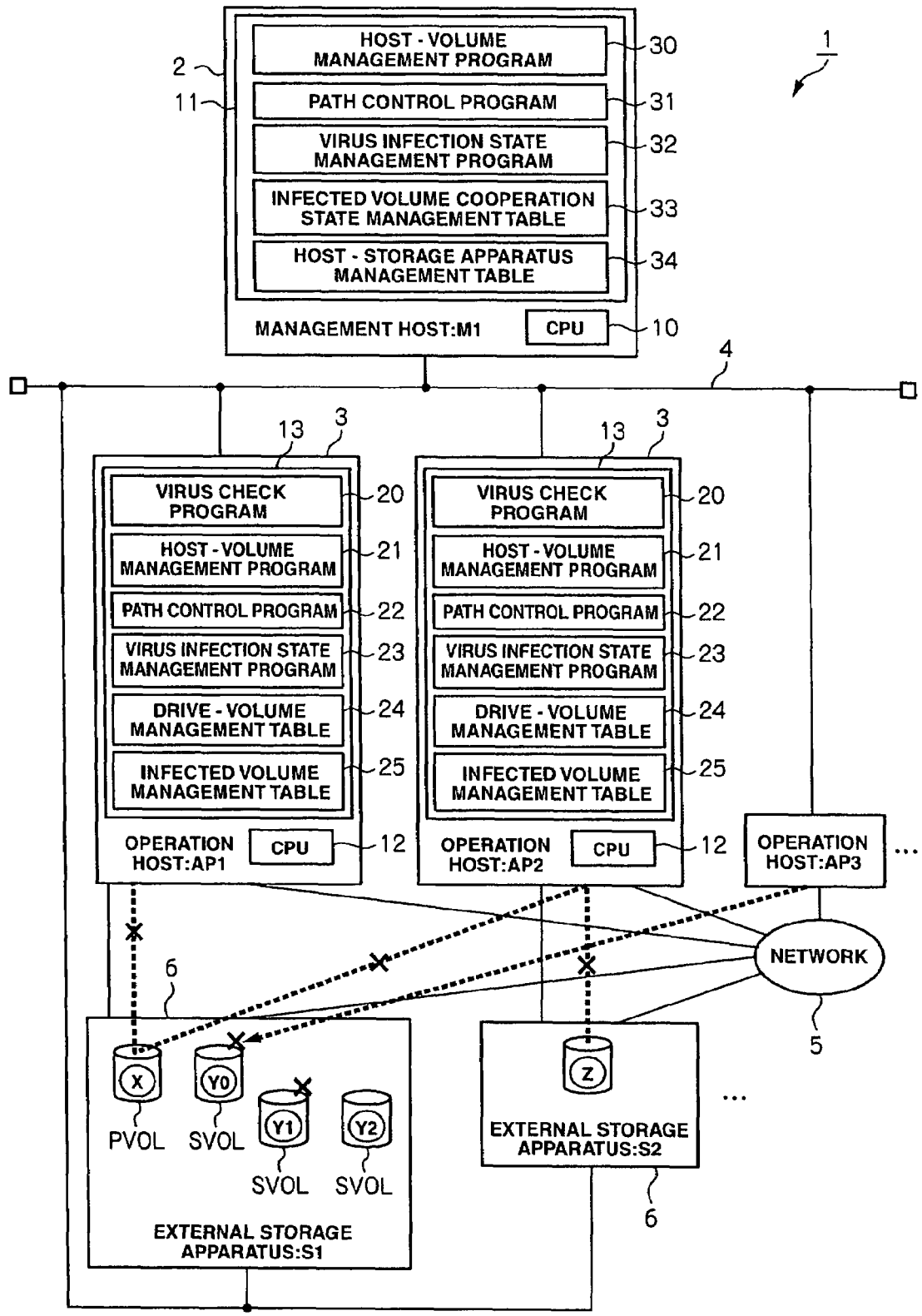
FIG. 8 is a block view illustrating a virus infection spreading prevention function.

For example, as shown in FIG. 8, in the event that notification is given to management host 2 from operation host 3 referred to as "AP1" that primary volume PVOL referred to as "X" within external storage apparatus 6 referred to as "S1" is infected with a virus, the virus infection state management program 32 of the management host 2 instructs the operation host 3 to put the path between the primary volume PVOL and the operation host 3 offline, and instructs for the path with the primary volume PVOL to be offline even for the operation host 3 referred to as "AP2" used by the primary volume PVOL.

Further, the virus infection state management program 32 of the management host 2 instructs the operation host 3 referred to as "AP1" to ensure that this cooperation is suppressed in the event that the primary volume PVOL referred to as "X" and the secondary volume SVOL referred to as "Y0" are operating in a cooperative manner. Further, the virus infection state management program 32 of the management host 2 controls the external storage apparatus 6 referred to as "S1" in such a manner that this secondary volume SVOL is not mounted when the secondary value SVOL referred to as "Y1", of the secondary volume SVOL referred to as "Y0" and the secondary volumes SVOL referred to as "Y1" and "Y2" storing back up data of the secondary volume SVOL, is infected with a virus.

Further, after this, the virus infection state management program 32 of the management host 2 instructs a virus check to other primary volumes PVOL used by the other operation hosts 3 to the other operation hosts 3 using the primary volume PVOL infected with the virus (SP6), and in the event that the other primary volumes PVOL are infected with a virus, settings are changed so that the path between the other primary volume PVOL and the other operation hosts 3 is put from offline to online. In this case also, the virus infection state management program 32 ensures that the dedicated path 17 remains online (SP7).

For example, in FIG. 8, in the case that the operation host 3 referred to as "AP2" also uses a primary volume PVOL referred to as "Z" set within the external storage apparatus 6 referred to as "S2" other than the primary volume PVOL referred to as "X" infected with the virus, the virus infection state management program 32 of the management host 2 instructs a virus check for the primary volume PVOL referred to as "Z" to the operation host 3 referred to as "AP2". Further, in the event that the primary volume PVOL referred to as "Z" is infected with a virus, the virus infection state management program 32 of the management host 2 provides an instruction to the operation host 3 referred to as "AP2" in order to put the path with the primary volume PVOL offline.

(2-2-2) Specific Content of Steps SP1 and SP2 of the Virus Infection Spreading Prevention Processing.

Figure 9:
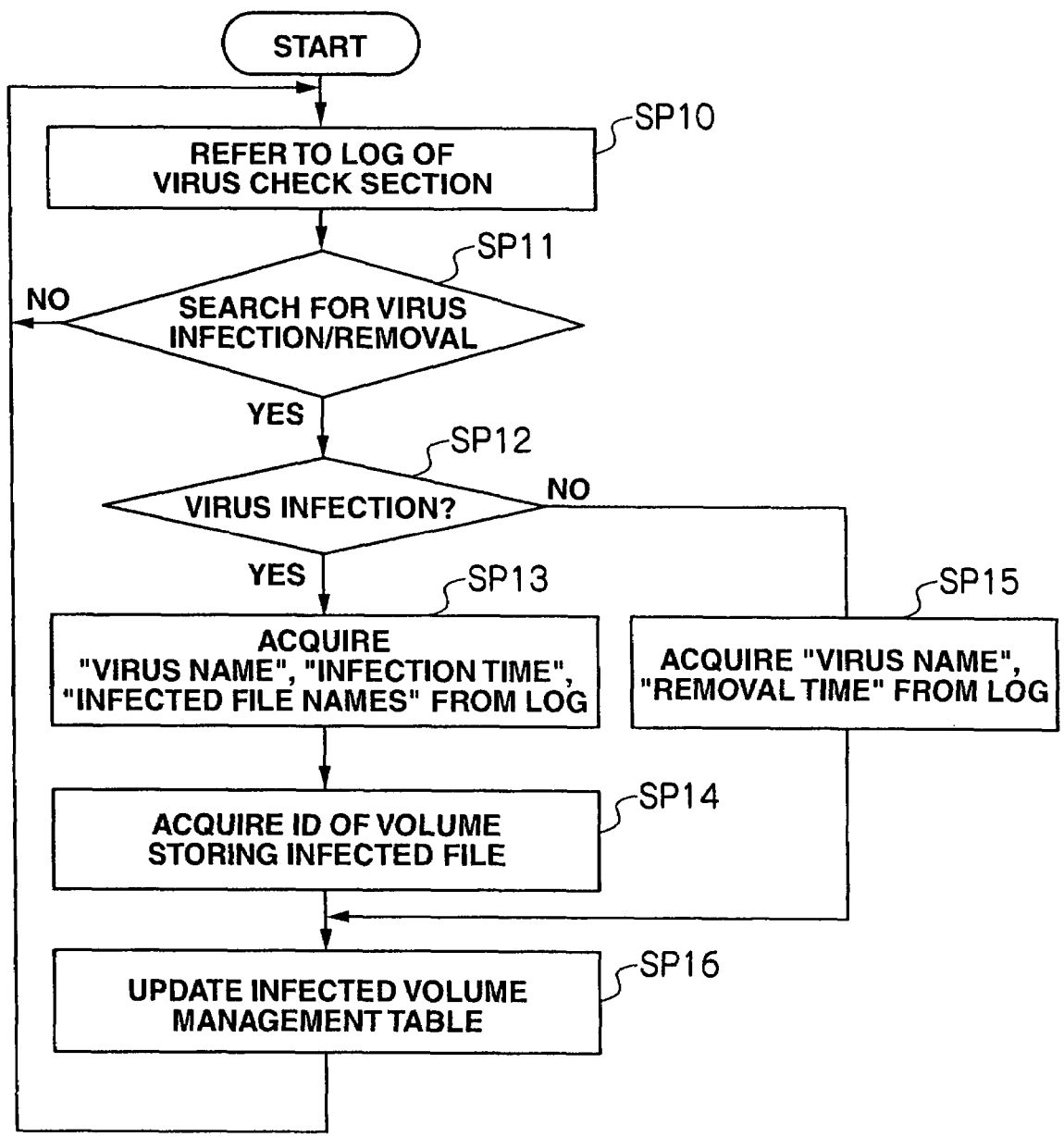
FIG. 9 is a flowchart showing specific processing content for a virus infection state of an operation host in virus infection spreading prevention processing.

FIG. 9 is a flowchart showing specific processing content of the virus infection state management program 23 of the operation host 3 occurring in step SP1 and step SP2 of the virus infection spreading prevention processing (FIG. 7).

When the virus check program 20 periodically starts virus check processing according to the activation of the operation host 3, the virus infection state management program 23 starts virus infection observation processing in accompaniment with this, and first refers to a log of virus check processing executed by the virus check program 20 (SP10).

The virus check program 20 then detects whether any of the primary volumes PVOL used by the operation host 3 are infected with a virus based on this log, and the virus infection state management program 23 determines whether or not the virus check program 20 has removed this virus (SP11). When a negative result is obtained for this determination, after this, in step SP11, the virus infection state management program 23 awaits an affirmative result in step SP11 (SP10-SP11-SP10).

When an affirmative result is then obtained in step SP11, the virus infection state management program 23 determines whether or not that detected by the virus check program 20 is "one or more of the primary volumes PVOL is infected with a virus" based on this log (SP12).

When an affirmative result is obtained in this determination, the virus infection state management program 23 acquires the virus name of the virus detected at this time, the infected time, and the file names of infected files from the log referred to in step SP10 (SP13). The virus infection state management program 23 then interrogates the host-volume management program 21 for the volume ID of the primary volume PVOL allocated to the drive letter (for example, "C:") contained in the acquired file name.

The host-volume management program 21 then manages the correlation of the drive letter and the volume VOL allocated to the drive letter using the drive-volume management table 24 described above. Upon receiving the interrogation from the virus infection state management program 23, the host-volume management program 21 searches the host-volume management program 21 for this volume ID, and notifies the virus infection state management program 23 of the retrieved volume ID. As a result of this, the virus infection state management program 23 acquires the volume ID for the primary volume PVOL infected with the virus (SP14).

Further, when information relating to the primary volume PVOL infected with a virus is not registered in the infected volume management table 25, based on the acquired volume ID, the virus infection state management program 23 newly registers this in the infected volume management table 25. With regards to this, when information relating to this primary volume PVOL is already registered in the infected volume management table 25, "infected state" column 25D of the corresponding entry is updated (SP16). The virus infection state management program 23 then repeats the same processing after this (SP10 to SP16-SP10).

Figure 10:
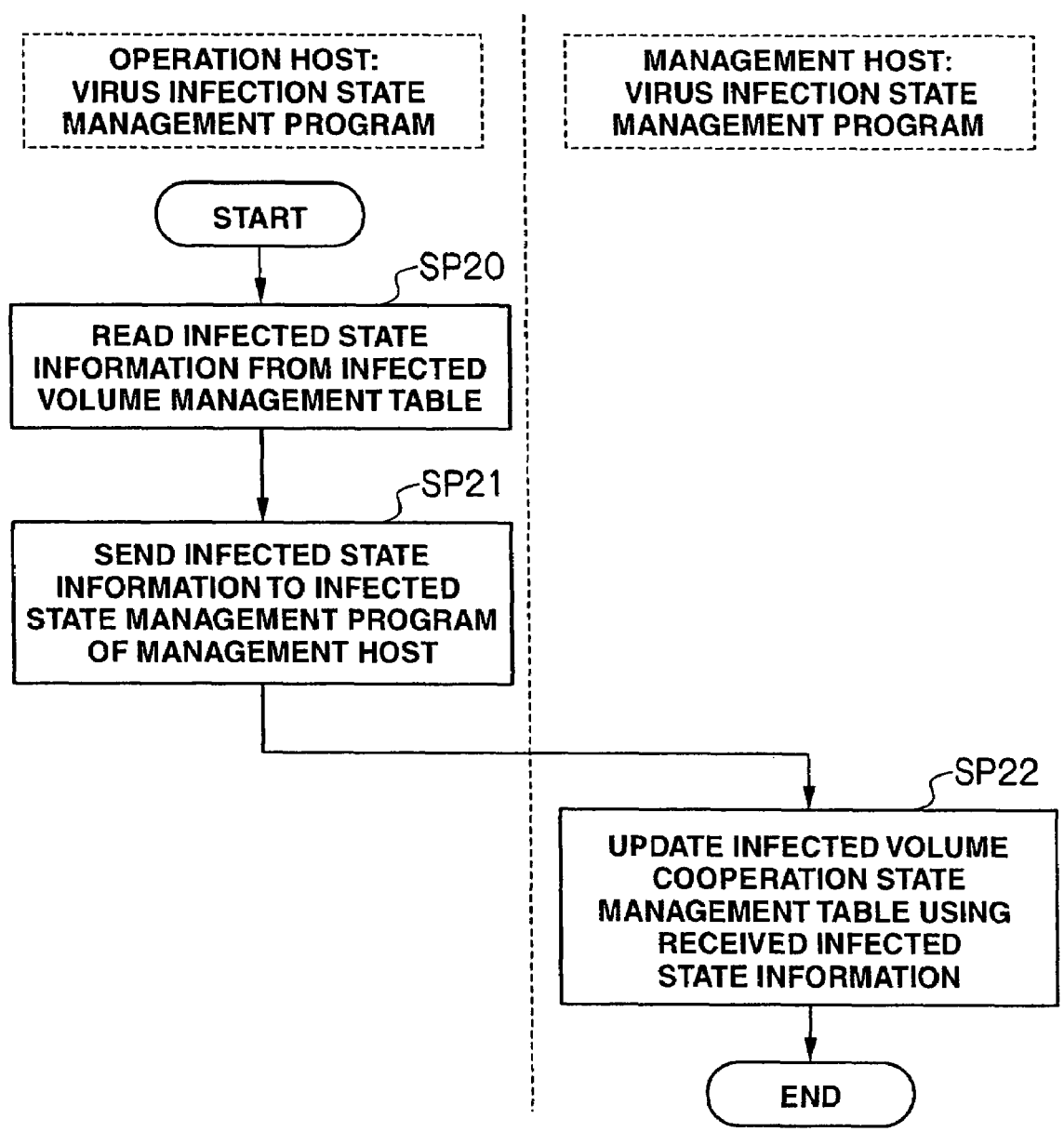
FIG. 10 is a flowchart showing specific processing between each virus infected state management program for the operation host and the management host in virus infection spreading prevention processing.

(2-2-2) Specific Content of Step SP3 of Virus Infection Spreading Prevention Processing FIG. 10 shows the flow of specific processing between the virus infection state management program 23 of the operation host 3 and the virus infection state management program 32 of the management host 2 in step SP3 of this virus infection spreading prevention processing (FIG. 7).

When the infected volume management table 25 is updated as described above, the virus infection state management program 23 of the operation host 3 reads out infected state information (virus name, infection time, and removal time) stored in the entry for "infected state" column 25G at this time on the infected volume management table 25 (SP20).

The virus infection state management program 23 of the operation host 3 then sends the read out infected state information to the virus infection state management program 32 (SP21). Specifically, in the event that the infected volume management table 25 is updated as a result of detection of a virus infection, the virus infection state management program 23 sends this to the virus infection state management program 32 of the management host 2 formatted as shown in FIG. 11(A), and in the event that the infected volume management table 25 is updated as a result of detection of virus removal, this is sent to the virus infection state management program 32 using the format shown in FIG. 11(B).

The virus infection state management program 32 of the management host 2 receiving the infection state information then updates the infected volume cooperation state management table 33 based on this infected state information (SP22). Specifically, the virus infection state management program 32 of the management host 2 stores the virus name and infection time obtained based on this infected state information in the "virus name" column 33H and the "infection time" column 33I constituting the "infected state" column 33D of the infected volume cooperation state management table 33. Further, an infection state flag indicating that this primary volume PVOL is infected with a virus is stored in the "infected state flag" column 33G for the corresponding entry (SP22).

Figure 12:
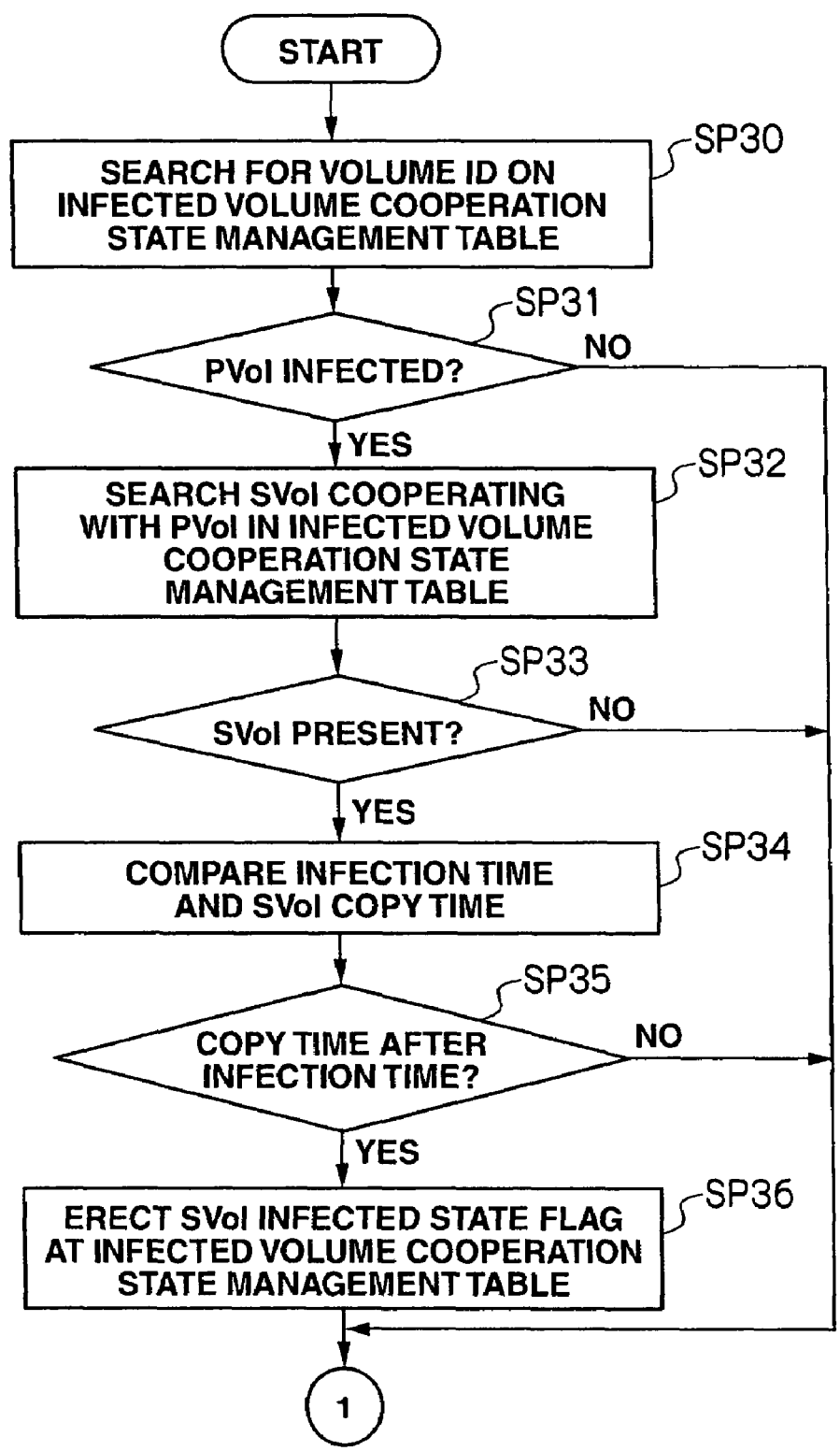
FIG. 12 is a flowchart illustrating virus infection countermeasure processing.
Figure 13:
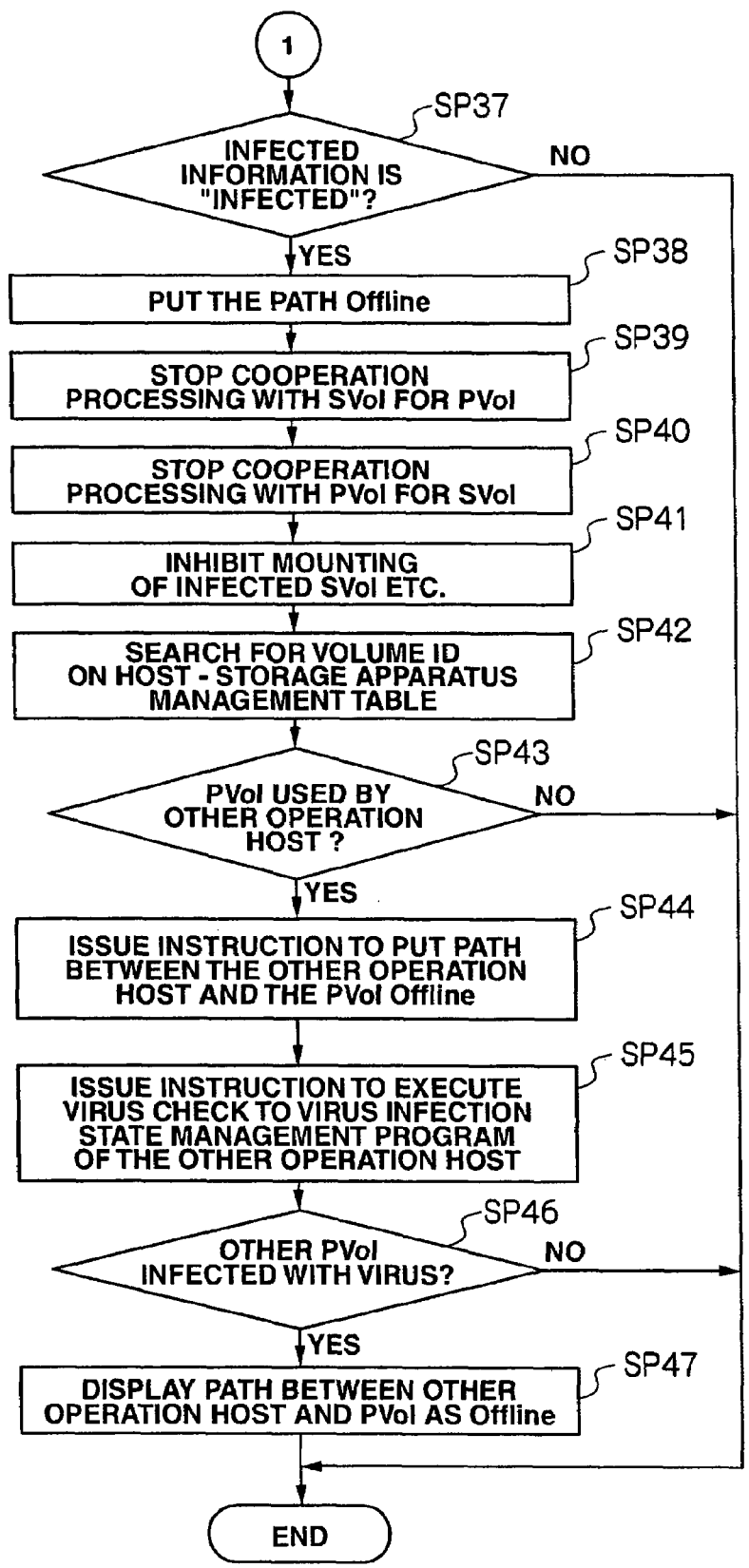
FIG. 13 is a flowchart illustrating virus infection countermeasure processing.

(2-2-4) Specific Processing Content for Step SP4 to Step SP7 of the Virus Infection Spreading Prevention Step On the other hand, after updating the infected volume cooperation state management table 33 (FIG. 5), in the event that updating of the infected volume management table 25 (FIG. 4) at the operation host 3 is to the effect that a virus infection has been detected, the virus infection state management program 32 of the management host 2 receiving the infection state information specifies the range of influence of the virus infection within the storage system 1, and the virus infection countermeasure processing shown in FIG. 12 and FIG. 13 is executed in order to distance the volumes VOL (primary volume PVOL, secondary volume SVOL) infected with the virus.

Namely, when this virus infection countermeasure processing starts, the virus infection state management program 32 of the management host 2 first searches the infected volume cooperation state management table 33 taking a volume ID contained in the infected state information sent from the operation host 3 as a keyword (SP30), and determines whether or not a volume VOL infected with the virus is a primary volume PVOL (SP31).

When a negative result is obtained in this determination, the virus infection state management program 32 proceeds to step SP37, and a volume ID for a secondary volume SVOL (connected as a pair) operating in cooperation with this primary volume PVOL is searched for on the infected volume cooperation state management table 33 (SP32).

The virus infection state management program 32 then determines whether or not the volume ID of the secondary volume SVOL is detected in this search, i.e. determines whether or not a secondary volume SVOL operating in cooperation with the primary volume PVOL is present (SP33), and step SP37 is proceeded to when a negative result is obtained.

With regards to this, when an affirmative result is obtained in the determination of step SP33, the virus infection state management program 32 refers to the infected volume cooperation state management table 33 and compares the time this primary volume PVOL was infected with the virus (the time stored in the "infected time" column 33I of the infected volume cooperation state management table 33) and the time of copying data stored in the primary volume PVOL to this secondary volume SVOL (the time stored in the "copy time" column 33F of the infected volume cooperation state management table 33) (SP34).

The virus infection state management program 32 then determines whether or not the time that data stored in this primary volume PVOL is copied to the secondary volume SVOL is after the time that the primary volume PVOL became infected with the virus (SP35).

Obtaining of a negative result in this determination means that data back up was carried out to the secondary volume SVOL before the primary volume PVOL was infected with the virus and means that there is no fear that the secondary volume SVOL is infected with the problematic virus at this time. The virus infection state management program 32 at this time then proceeds to step SP37.

On the other hand, obtaining of an affirmative result in this determination means that data back up was carried out to the secondary volume SVOL after the primary volume PVOL was infected with the virus and means that there is a fear that the secondary volume SVOL is infected with the problematic virus at this time. At this time, the virus infection state management program 32 stores an infected state flag (stores "1") in the "infection present/absent" column 33G of the entry where the volume ID of the secondary volume SVOL is stored in the "SVolID" column 33E of the infected volume cooperation state management table 33 (SP36).

The virus infection state management program 32 finally determines whether this infected state information is for any of the primary volumes PVOL sent from the operation host 3 that are infected with a virus based on the received infection state information (SP37).

The virus infection state management program 32 ends the virus infection countermeasure processing when a negative result is obtained in this determination. On the other hand, when an affirmative result is obtained, the operation host 3 sending this infected state information is controlled, and the path between the operation host 3 and the primary volume PVOL infected with the virus is made to go offline (SP38).

Further, by controlling the operation host 3, the virus infection state management program 32 stops cooperation with the corresponding secondary volume SVOL for this primary volume PVOL (separates the pair) (S39), and stops cooperation with this primary volume PVOL for the secondary volume SVOL (SP40). Further, by controlling the operation host 3, the virus infection state management program 32 inhibits mounting of the primary volume PVOL and the secondary volume SVOL the infected state flags are erected for in the infected volume cooperation state management table 33 (SP41).

Continuing on, the virus infection state management program 32 searches for the volume ID of this primary volume PVOL in the host-storage apparatus management table 34 (FIG. 6) in the "VolID" column 34C (SP42) and determines whether or not other operation hosts 3 used by the primary volume PVOL exist based on the results of this search (SP34). The virus infection state management program 32 then ends this virus infection countermeasure processing when a negative result is obtained in this determination.

On the other hand, when an affirmative result is obtained in this determination, by controlling the other operation hosts 3, the virus infection state management program 32 causes the paths connecting the other operation hosts 3 and the primary volume PVOL to go offline (SP44), and after this, issues a command to instruct the execution of a virus check at the other operation hosts 3 (SP45).

As a result, based on this command, at the other operation hosts 3, a virus check is carried out on all of the primary volumes PVOL used by the other operation hosts 3 themselves, and the results of the virus checks are sent to the virus infection state management program 32 of the management host 2.

The virus infection state management program 32 determines whether or not virus infections have occurred at any of the primary volumes PVOL used by the other operation host 3 based on virus checks sent from the other operation hosts 3 (SP46).

The virus infection state management program 32 then ends this virus infection countermeasure processing when a negative result is obtained in this determination. On the other hand, when an affirmative result is obtained in this determination, by controlling the other operation hosts 3, the virus infection state management program 32 puts the path connecting the other operation hosts 3 and the primary volume PVOL infected with the virus offline (SP47), and the virus infection countermeasure processing is ended.

Figure 14:
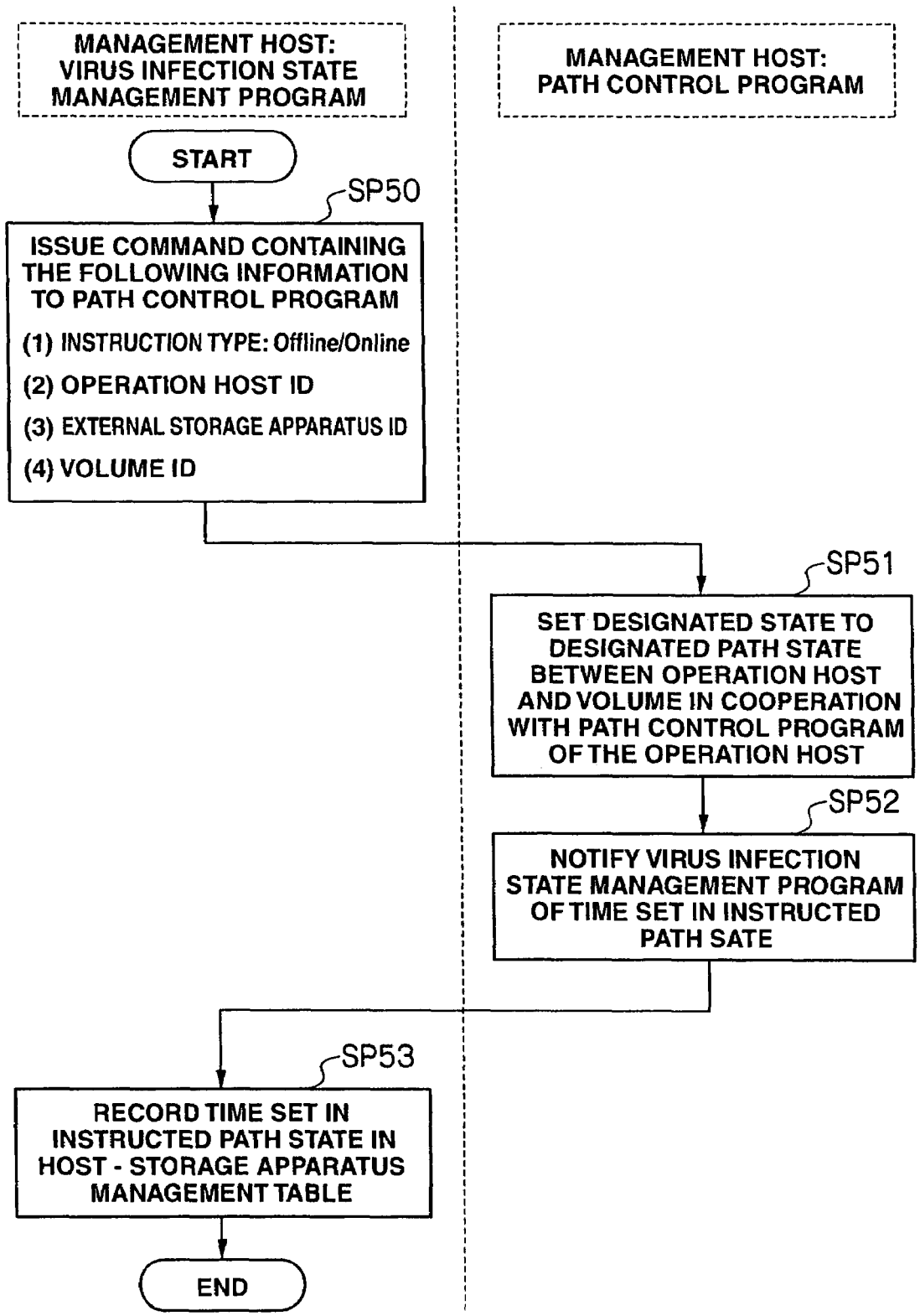
FIG. 14 is a flowchart showing the flow of processing in the case where a virus infection state management program of the management host makes a predetermined path online or offline.

The flow of processing for the case of the virus infection state management program 32 of the management host 2 putting a desired path online or offline as relating to step SP38, step SP44 and step SP47 described above is shown in FIG. 14.

In this case, as shown in FIG. 15, the virus infection state management program 32 of the management host 2 issues a command (hereinafter referred to as a "path control command") containing an instruction type (code for either "online" or "offline"), a host ID for the operation host 3, an apparatus ID for the external storage apparatus 6 the path that is the target at this time is connected to, and volume ID's of volumes (VOL (primary volume PVOL or secondary volume SVOL) the path is connected to, to the path control program 31 (FIG. 1) of the management host 2 (SP50).

The path control program 31 of the management host 2 receiving this path control command operates in cooperation with the path control program 22 (FIG. 1) of the operation host 3 designated in the path control command, and the state of the path between the operation host 3 and the primary volume PVOL designated in the path control command is set to the state (offline or online) set at the path control command.

The path control program 31 then notifies the virus infection state management program 32 of the management host 2 of the time of setting the path state described above.

Upon receiving this time, the virus infection state management program 32 of the management host 2 records the time in the "path state" column 34D of the entry corresponding to this path at the host-storage apparatus management table 34 (FIG. 6). Specifically, virus infection state management program 32 changes the "state" column 34E of this entry to the current state of this path (online or offline), and stores the time sent from the path control program 31 described above in the "offline time" column 34F for this entry or the "online" column 34G (SP53).

Figure 16:
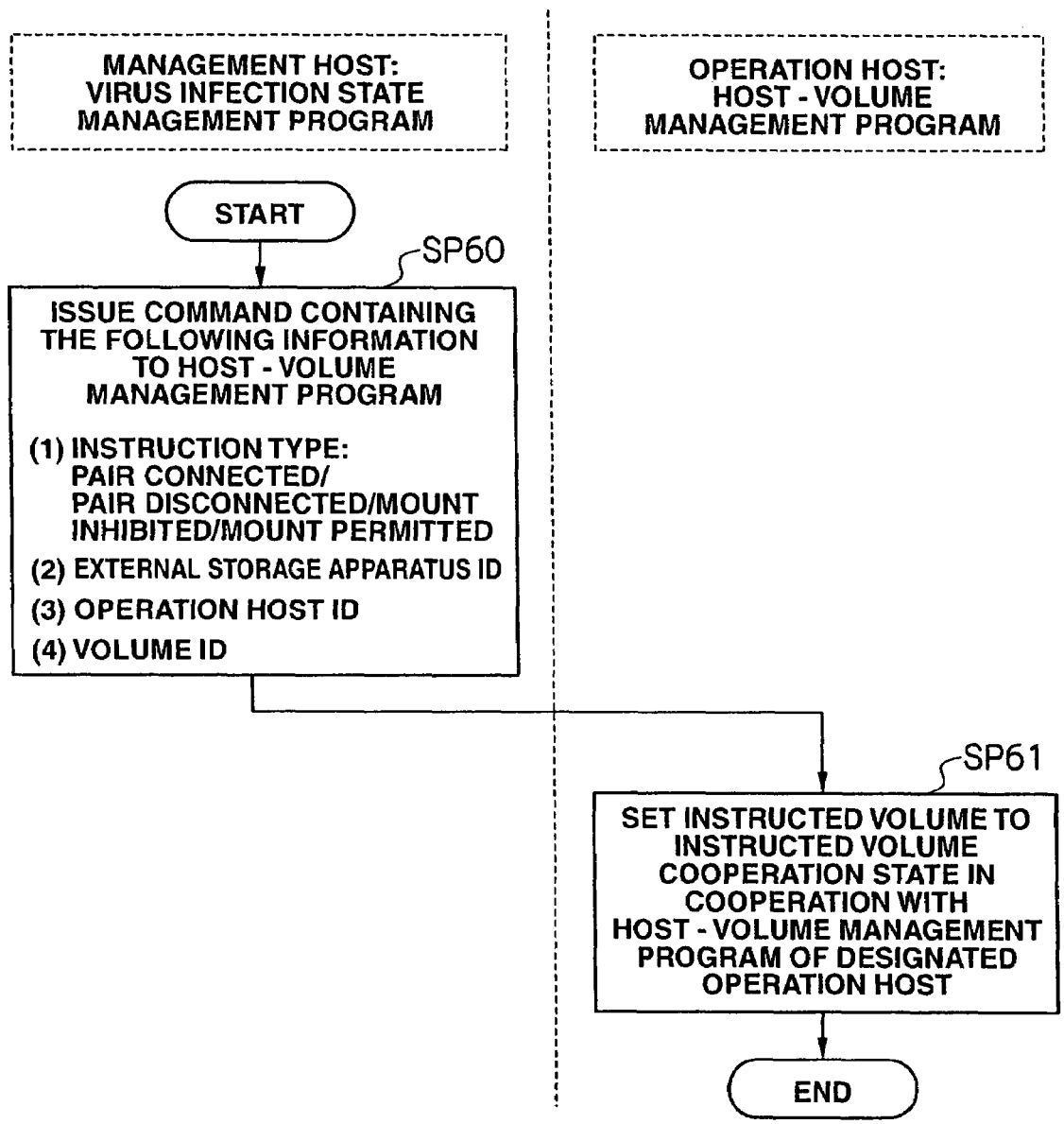
FIG. 16 is a flowchart illustrating the flow in the case where a virus infection state management program of the management host stops or starts cooperation with volumes, or the case where mounting of a desired volume is denied or permitted.

Further, the flow of processing for the case where the virus infection state management program 32 of the management host 2 stops or starts (pair connection, pair disconnection) cooperation of a desired volume VOL with other volumes VOL or processing for the case of inhibiting or permitting mounting of a desired volume VOL is shown in FIG. 16 in relation to step SP39, step SP40 and step SP41 of the virus infection countermeasure processing described in FIG. 12 and FIG. 13.

In this case, the virus infection state management program 32 of the management host 2 issues a command (hereinafter referred to as a "volume pair/mount control command") containing an instruction type (code that is any of "pair connection", "pair disconnection", "mount inhibit", or "mount permit"), an apparatus ID for the external storage apparatus 6 set for the volume VOL constituting the target, a host ID for the operation hosts 3 connected to this external storage apparatus 6 via the dedicated path 17, and a volume ID for the volume VOL on the opposing side in the case of stopping or starting setting of the volume cooperation, to the host-volume management program 30 (FIG. 1) of the management host 2 (SP60).

The host-volume management program 30 of the management host 2 receiving this volume pair/mount control command then controls the designated external storage apparatus 6 so as to operate in unison with the host-volume management program (FIG. 1) of the operation hosts 3 designated in the volume pair/mount control command, set a state (mount inhibit or mount permit) instructing whether or not mounting of the designated volume VOL is possible, and set a state (stopping or starting of cooperation) designating cooperation between the volume VOL designated as the target volume and the volume VOL designated as the opposing side volume (SP61).

Figure 18:
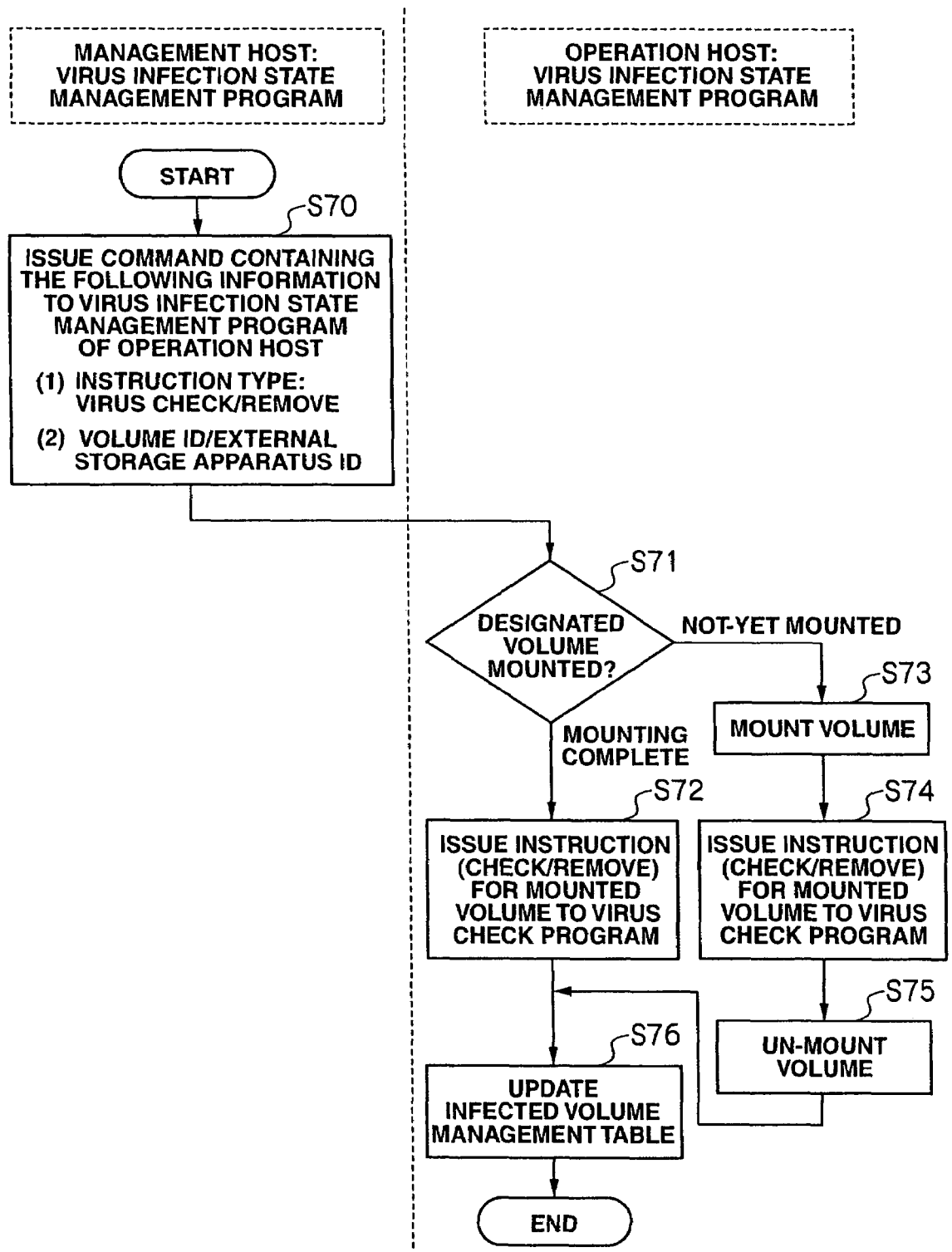
FIG. 18 is a flowchart showing the flow of processing in the case where a virus infection state management program of the management host executes a virus check or virus removal at a desired operation host.

Further, with regards to the step SP45 for the virus infection countermeasure processing described above in FIG. 12 and FIG. 13, the flow of processing for the case of the virus infection state management program 32 of the management host 2 executing a virus check or virus removal at the desired operation host 3 is shown in FIG. 18.

In this case, as shown in FIG. 19, virus infection state management program 32 of the management host 2 issues a command (hereinafter referred to as a "virus check/removal command") containing an instruction type (code for either of "virus check" or "virus removal"), a volume ID for the volume VOL that is the target, and apparatus ID of the external storage apparatus 6 set for this volume VOL, to the virus infection state management program 23 of the operation host 3 connected to the external storage apparatus 6 via the dedicated path 17 (SP70).

The virus infection state management program 23 of the operation host 3 receiving the virus check/removal command then first interrogates the host-volume management program 21 (FIG. 1) of this operation host 3 as to whether or not a volume VOL of a volume ID designated in the virus check/removal command is currently mounted (SP71).

Upon obtaining the results of the interrogation as this volume VOL being mounted, the virus infection state management program 23 of the operation host 3 issues an instruction for executing virus check processing or virus removal processing designated in the virus check/removal command for this volume VOL to the virus check program 20 (FIG. 1) of the operation host 3 (SP72). As a result, virus check processing or virus removal processing is carried out on this volume VOL by the virus check program 20, and the results of this processing are provided to the virus infection state management program 23 of the operation host 3.

When the processing results of this virus check processing or the virus removal processing are supplied by the virus check program 20, in response, the virus infection state management program 23 of the operation host 3 updates the infected volume management table 25 (FIG. 4) (SP76).

On the other hand, upon obtaining the interrogation results to the effect that this volume VOL is not mounted, after mounting this volume VOL (SP73), the virus infection state management program 23 of the operation host 3 issues an instruction to execute virus check processing or virus removal processing designated in the virus check/removal command on this volume VOL to the virus check program 20 of the operation host 3 (SP74). As a result, virus check processing or virus removal processing is carried out on this volume VOL by the virus check program 20, and the results of this processing are provided to the virus infection state management program 23 of the operation host 3.

When the processing results for the virus check processing or the virus removal processing are supplied by the virus check program 20, after un-mounting the volume VOL, the infected state management program 23 of the operation host 3 updates the infected volume management table 25 according to the processing results of the virus check processing or the virus removal processing (SP76).

After this, as in the case described above for FIG. 10, the virus infection state management program 32 of the management host 2 is notified of the content of updating of the infected volume management table 25 by the virus infection state management program 23 of the operation host 3, and the infected volume cooperation state management table 33 of the management host 2 is updated according to this notification.

(2-3) Processing Relating to Virus Removal Support Function (2-3-1) Outline of Virus Removal Support Function and Screen Configuration Next, a description is given of the specific processing content of the virus infection state management program 32 of the management host 2 and the virus infection state management program 23 of the operation hosts 3 as pertaining to the virus removal support function.

At the storage system 1 of this embodiment, a first virus removal method for removing viruses using the functions of virus removal tools of the virus check programs 20 mounted on each of the operation hosts 3 as described above, and a second virus removal method of restoring (recovering) a primary volume PVOL to a state prior to infection by the virus utilizing back-up data in the event that a back-up for data stored on the primary volume PVOL exists are prepared as methods for removing viruses from the primary volume PVOL when the primary volume PVOL within the storage system 1 is infected with a virus.

The system administrator is then able to acquire information relating to the features of the virus infecting the primary volume PVOL and the range of influence etc. from the home page of the virus check vendor etc., and is able to select an appropriate method from the first and second virus removal methods taking into consideration the influence on applications etc. based on this information. For example, the first virus removal method may be selected in cases where a restore is not possible because there is no back-up of the primary volume PVOL infected with the virus or in cases where restoring is not deemed necessary due to damage cause by the virus infection being slight, and the second virus removal method may be selected in cases where damage caused by the virus infection is substantial and the time required to remove the virus infection is substantial or where the virus cannot be removed completely.

However, determining the extent of damage etc. caused by the virus infection and the time required to remove the virus infection is difficult. It is therefore more straightforward for the system administrator to determine which of the first and second virus removal methods to apply.

At the storage system 1 of this embodiment, the virus removal operation by the system administrator is supported by the management host 2 displaying information for each of the primary volumes PVOL within the system such as whether a primary volume PVOL is infected with a virus and the range of influence if infected with a virus, and estimated results for the case of carrying out virus removal using the first and second virus removal methods in the event of infection with a virus on a display screen.

FIG. 20 shows a specific configuration for a virus infection state screen 40 displayed at the management host 2 for instructing a system administrator of this kind of information. As is clear from FIG. 20, the virus infection state screen 40 is configured from an infected volume cooperation state management information display section 41, host-storage apparatus management information display section 42, and button display section 43.

As with the infected volume cooperation state management table 33 described above in FIG. 5, the infected volume cooperation state management information display section 41 is configured from "storage apparatus ID" column 41A, "PVOLID" column 41B, "restore time/Vol" column 41C, "infected state" column 41D ("virus name" column 41H, "infected time" column 41I, "removal time" column 41J), "SVolID" column 41E, "copy time" column 41F, and "infection present/absent" column 41G. The same information as is stored in the corresponding columns 33A to 33J of the infected volume cooperation state management table 33 is displayed respectively within each of the columns 41A to 41J.

As with the host-storage apparatus management table 34 described above in FIG. 6, the host-storage apparatus management information display section 42 is configured from "storage apparatus" column 42B, "VolID" column 42C, "path state" column 42D ("state" column 42E, "offline time" column 42F, "online time" column 42G), and displays the same information as the information stored in columns 34A to 34G corresponding to the host-storage apparatus management table 34 within each column 42A to 42G.

The system administrator is therefore able to recognize which primary volumes PVOL are contaminated with a virus, the extent of the range of influence of the virus infection (as far as which secondary volumes SVOL the virus has had an influence on), and the current state (online or offline) of each path connecting between the primary volumes PVOL and the operation volumes 3 based on the content of the infected volume cooperation state management information display section 41 and the host-storage apparatus management information display section 42 of the virus infection state screen 40.

Figure 21:
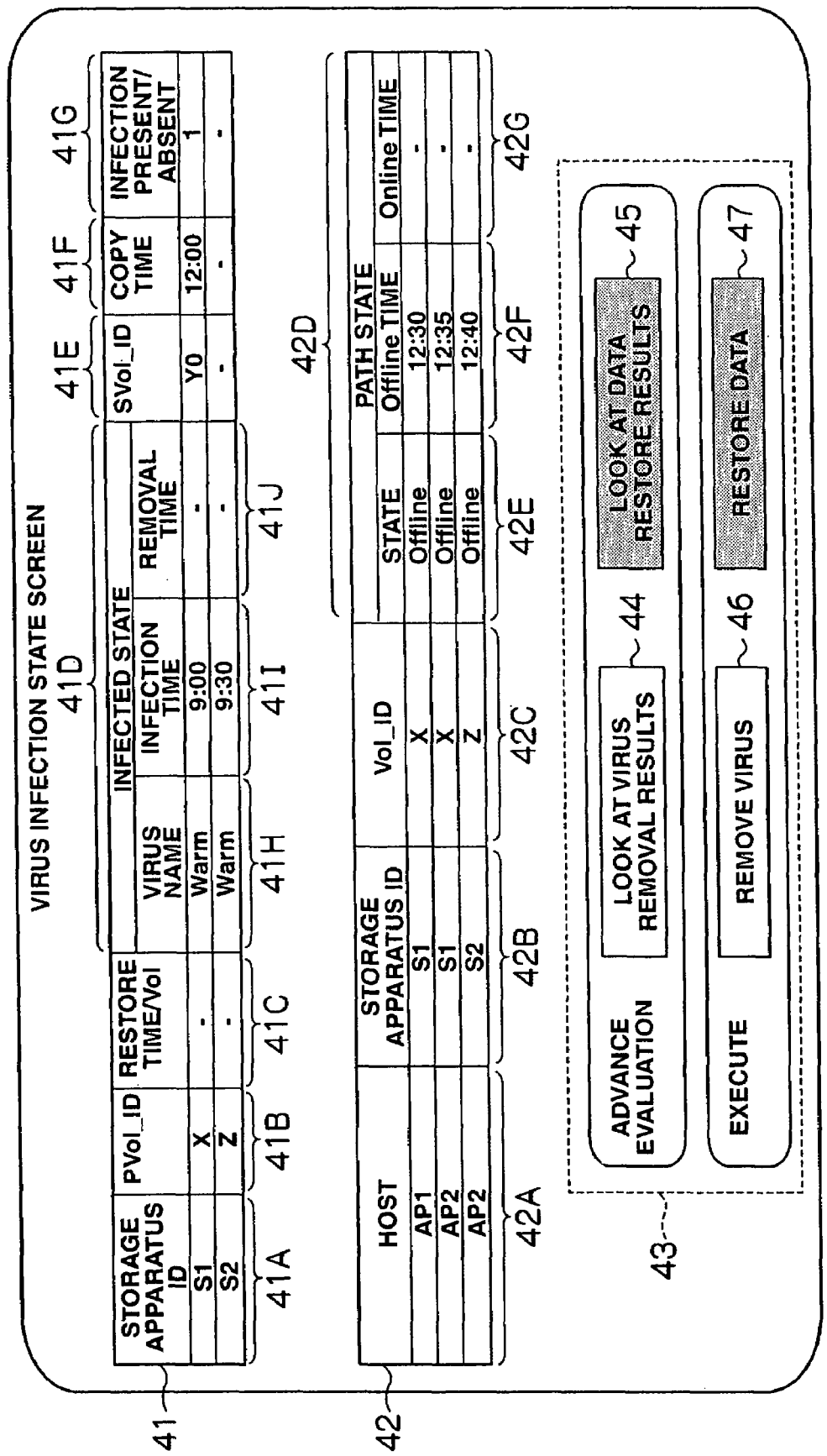
FIG. 21 is a further outline view illustrating a virus infection state screen.

On the other hand, first and second advance evaluation buttons 44, 45 and first and second execute buttons 46, 47 are displayed at the button display section 43. However, in the event that, of the volumes VOL confirmed as being infected with a virus, there is not one volume back up data is held for, as shown in FIG. 21, the second advance evaluation button 45 and the second execute button 47 are displayed as being inactive.

At the virus infection state screen 40, it is possible to display anticipated results for when virus removal processing is executed for a volume VOL infected with a virus at the virus infection state screen 40 by clicking the first advance evaluation button 44. At this time, the first advance evaluation button 44 is displayed in an inactive manner.

Specifically, a virus removal predicted results display section 50 as shown in FIG. 22 is displayed afresh on the virus infection state screen 40 as the anticipated results. The virus removal predicted results display section 50 has the same configuration as the infected volume cooperation state management information display section 41 with the exception of a "required removal time" column 50J. The time (hereinafter referred to as "estimated virus removal time") estimated as being necessary for executing virus removal processing on the corresponding volume VOL is displayed at the corresponding "required removal time" column 50J within the virus removal predicted results display section 50.

In the event that the second advance evaluation button 45 is displayed in an active manner at the virus infection state screen 40, it is possible to display the results predicted for the time of restoring data within the volume VOL infected with a virus for which back up data exists to the state before infection with a virus at the virus infection state screen 40 by clicking the second advance evaluation button 45. During this time, the second advance evaluation button 45 is displayed in an inactive manner.

Specifically, a predicted restore results display section 51 as shown in FIG. 23 is displayed afresh on the virus infection state screen 40 as the anticipated results. The predicted restore results display section 51 has the same configuration as the infected volume cooperation state management information display section 41 with the exception of a "required restore time/Vol" column 51C and "required copying time" column 51K. At the predicted restore results display section 51, the time (hereinafter referred to as "predicted restore time" predicted as being required when executing restore processing for the corresponding volume VOL is displayed at the corresponding "required restore time/Vol" column 51C, and the time (hereinafter referred to as the "predicted copying time") for copying data to the corresponding secondary volume SVOL after restoring this volume VOL is displayed in the "required copying time" column 51K.

Further, at the predicted restore results display section 51, in the event that a secondary volume SVOL to be deleted as described in the following exists when the corresponding volume VOL is restored, an indication ("Deleted") to this effect is displayed in the "SVolID" column 51E of the corresponding entry.

The administrator is then able to select the more appropriate virus removal method of the first and second virus removal methods for the conditions based on the virus deletion processing due to virus removal processing and each of the predicted results for the time of executing virus removal using restore displayed at the management host 2 in this manner.

Namely, the state of the virus infection state screen 40 for when results predicted for the time of executing virus removal processing and results predicted for when this restore processing is executed is shown in FIG. 23 but it is also possible for only the results estimated for the time of executing restore processing to be displayed on the virus infection state screen 40 in an independent manner.

On the other hand, at the virus infection state screen 40, it is possible to execute virus removal processing for removing a virus of a volume VOL infected with a virus at the corresponding operation host 3 by clicking the first execute button 46. In this case, as shown in FIG. 24, the processing results for the virus removal processing are displayed at the management host 2 as a virus removal results screen 60.

An infected volume cooperation state management information display section 61 having the same configuration as the infected volume cooperation state management information display section 41 of the virus infection state screen 40, a host-storage apparatus management information display section 62 having substantially the same configuration as the host-storage apparatus management information display section 42 of the virus infection state screen 40, and an go online button 63 are displayed at the virus removal results screen 60.

The time of performing the virus removal is then displayed in a "removal time" column 61J corresponding to the volume VOL virus removal is carried out for at the infected volume cooperation state management information display section 61. Further, check boxes 62H are respectively displayed at the right side of a "path state" column 62E so as to respectively correspond to each entry at the host-storage apparatus management information display section 62.

The system administrator is then able to put these paths online by clicking the go online button 63 after selecting one or a plurality of paths by causing check marks to be displayed in the check boxes 62H of the required entries.

In this case, as shown in FIG. 25, the virus removal results screen 60 changes the display for the "state" column 62E of the entry corresponding to the path put online at the host-storage apparatus management information display section 62 from "Offline" to "Online", and the check box 62H for this entry is made inactive.

On the other hand, the system administrator is able to execute restore processing for restoring the volume VOL infected with a virus to the state prior to infection with a virus at the corresponding operation host 3 by clicking the second execute button 47 of the virus infection state screen 40 (FIG. 20). In this case, as shown in FIG. 26, the processing results for the restore processing are displayed at the management host 2 as a restore results screen 70.

An infected volume cooperation state management information display section 71 having the same configuration as the infected volume cooperation state management information display section 41 of the virus infection state screen 40, a host-storage apparatus management information display section 72 having substantially the same configuration as the host-storage apparatus management information display section 42 of the virus infection state screen 40, and a go online button 73 are displayed at the restore results screen 70.

The time of carrying out a restore and the volume ID of the volume VOL carrying out the restore are displayed in the "restore time/Vol" column 71C of the entry corresponding to the volume VOL the restore is carried out for are displayed at the infected volume cooperation state management information display section 71. In the case of this embodiment, the secondary volume VOL is deleted when the secondary volume VOL for the second generation onwards storing the back up data for this volume VOL is infected with a virus. Here, when deletion of the secondary volume SVOL is carried out, an indication to this effect is displayed in the "SVolID" column 71E. Moreover, check boxes 72H are respectively displayed at the right side of a "path state" column 72E so as to respectively correspond to each entry at the host-storage apparatus management information display section 72.

The system administrator is then able to put these paths online by clicking the go online button 73 after selecting one or a plurality of paths by causing check marks to be displayed in the check boxes 72H of the required entries.

In this case, as shown in FIG. 27, the restore results screen 70 changes the display for the "state" column 62E of the entry corresponding to the path put online at the host-storage apparatus management information display section 72 from "Offline" to "Online", and the check box 72H for this entry is made inactive.

Figure 28:
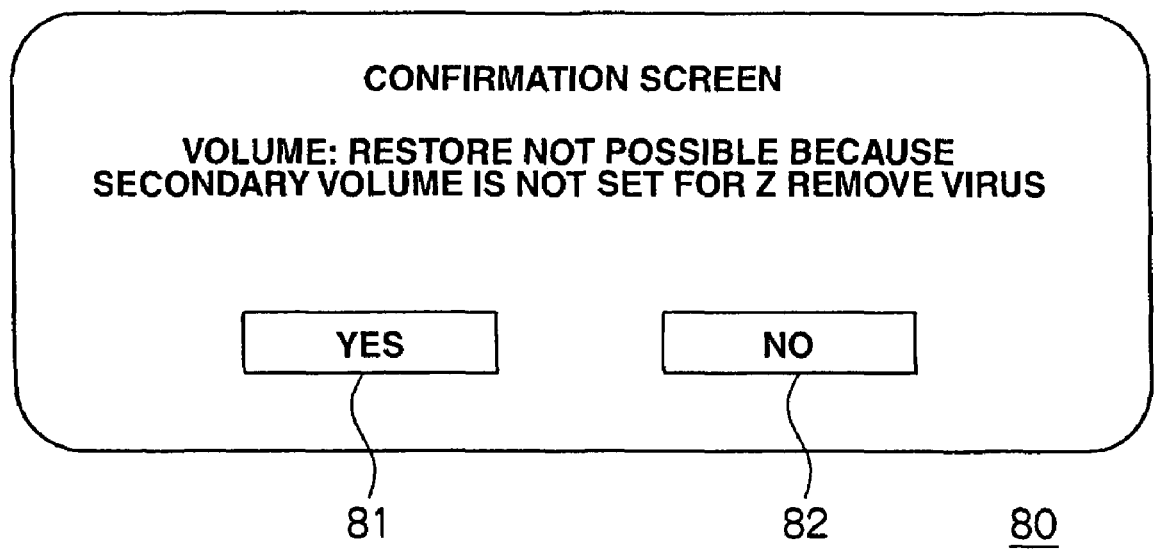
FIG. 28 is an outline view illustrating a confirmation screen.

At the virus infection state screen 40 (FIG. 20), in the event that the second advance evaluation button 45 or the second execute button 47 are clicked in a state where a primary volume PVOL that is not set with a secondary volume SVOL (i.e. cannot be restored) is included in the restore target, a confirmation screen 80 shown in FIG. 28 is displayed.

In this event, the system administrator is able to display estimated results for the time of executing virus removal processing at the corresponding operation host 3 for the primary volume PVOL that is not set with a secondary volume SVOL at the virus infection state screen 40 by clicking a "YES" button 81 at the confirmation screen 80, and it is possible to execute the virus removal processing.

Further, the system administrator is also able to ensure that both the restore processing and virus removal processing are not executed for the primary volume PVOL by clicking the "NO" button 82 at the confirmation screen 80.

Further, in the event that the "YES" button 81 is selected at the confirmation screen 80, as shown in FIG. 23, the predicted virus removal time is displayed in the corresponding "removal time" column 51J within the predicted restore results display section 51 displayed at the virus infection state screen 40, or as shown in FIG. 26, predicted virus removal time is displayed in the corresponding "removal time" column 71J within the infected volume cooperation state management information display section 71 displayed at the restore results screen 70.

(2-3-2) Processing for Each Virus Infection State Management Program for the Management Host and the Operation Hosts Next, a description is given of specific processing content of the virus infection state management program 32 of the management host 2 and each of the virus infection state management program 23 of the operation hosts 3 as pertaining to the virus removal support function.

(2-3-2-1) Processing for the Virus Infection State Management Program of the Management Host Relating to Each Type of Screen Display FIG. 29 to FIG. 33 show detailed processing content of the virus infection state management program 32 of the management host 2 as pertaining to displaying of the virus infection state screen 40.

Figure 29:
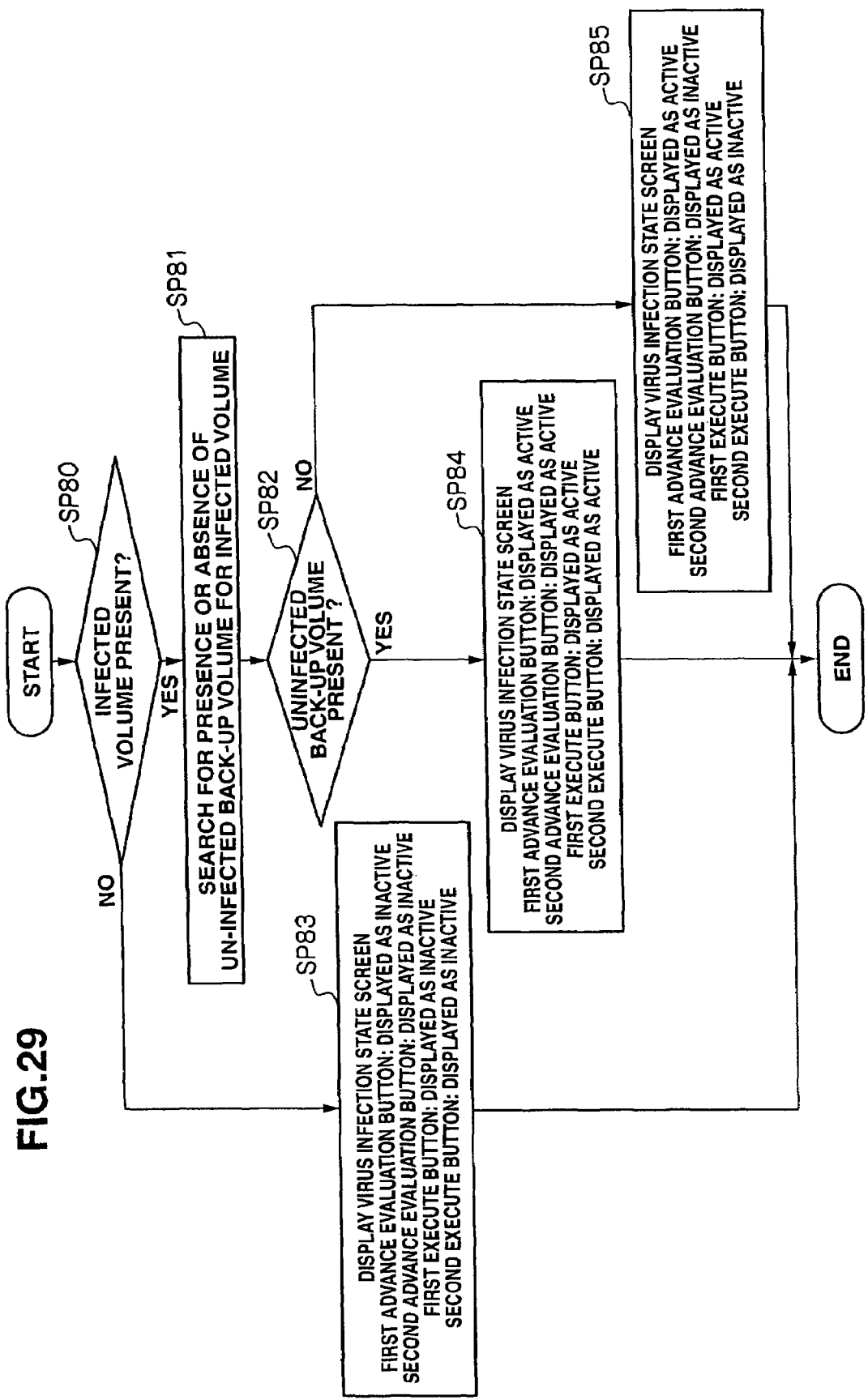
FIG. 29 is a flowchart illustrating virus infection state screen display processing.

When a display instruction of the virus infection state screen 40 is inputted by the system administrator, the virus infection state management program 32 of the management host 2 starts virus infection state screen display processing shown in FIG. 29, and first determines whether or not a volume VOL infected with a virus is present within the storage system 1 based on the infected volume cooperation state management table 33 (FIG. 1) held in the memory 11 (FIG. 1) (SP80).

When a negative result is obtained in this determination, the virus infection state management program 32 displays the virus infection state screen 40 showing that the first and second advance evaluation buttons 44, 45 and the first and second execute buttons 46, 47 are each inactive at the management host 2 based on the infected volume cooperation state management table 33 and the host-storage apparatus management table 34 (FIG. 1) (SP83). After this, the virus infection state management program 32 ends the virus infection state screen displaying process.

On the other hand, when an affirmative result is obtained in this determination, the virus infection state management program 32 determines whether or not secondary volumes SVOL that are not infected with a virus exist for each of the volumes VOL infected with the virus based on the infected volume cooperation state management table 33 (SP82).

When an affirmative result is obtained in this determination, the virus infection state management program 32 displays the virus infection state screen 40 showing that the first and second advance evaluation buttons 44, 45 and the first and second execute buttons 46, 47 are each active at the management host 2 based on the infected volume cooperation state management table 33 and the host-storage apparatus management table 34 (SP84). After this, the virus infection state management program 32 ends the virus infection state screen displaying process.

On the other hand, when a negative result is obtained in the determination of step SP82, the virus infection state management program 32 displays the virus infection state screen 40 at the management host 2 with the first advance evaluation button 44 and the first execute button 46 displayed in an active manner and the second advance evaluation button 45 and the second execute button 47 displayed in an active manner (SP85) based on the infected volume cooperation state management table 33 and the host-storage apparatus management table 34. After this, the virus infection state management program 32 ends the virus infection state screen displaying process.

Figure 30:
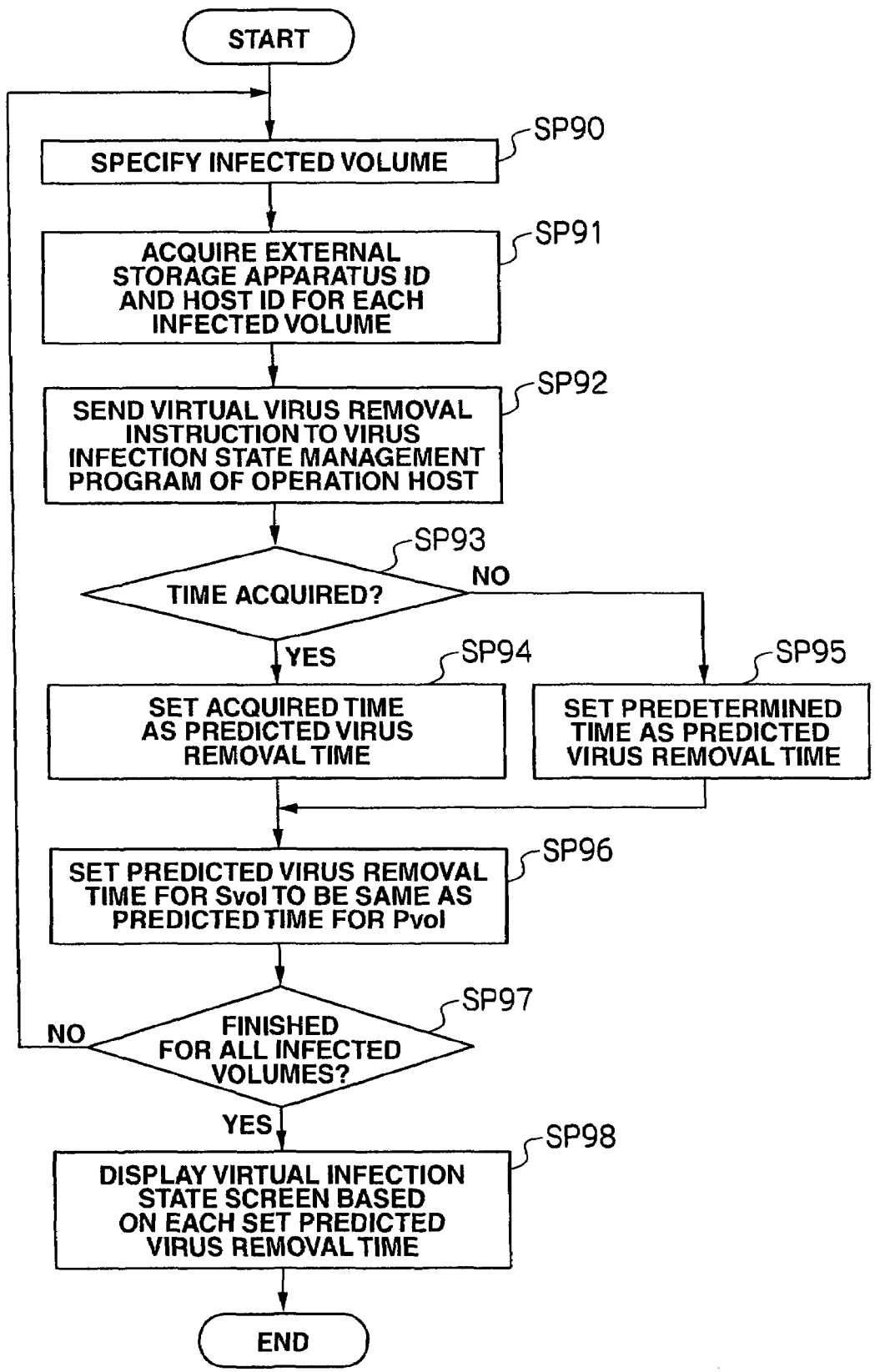
FIG. 30 is a flowchart illustrating virus removal estimated results display processing.

On the other hand, after this, when the first advance evaluation button 44 (FIG. 20) of the virus infection state screen 40 is clicked, the virus infection state management program 32 starts the virus removal estimated results display processing shown in FIG. 30, and first specifies the primary volume infected with a virus within the storage system 1 based on the infected volume cooperation state management table 33 and acquires the ID of this volume (SP90).

The virus infection state management program 32 then specifies the apparatus ID of the external storage apparatus set for the primary volume PVOL infected with the virus and the host ID's of operation hosts 3 using the primary volume PVOL based on the host-storage apparatus management table 34, and acquires the apparatus ID's and host ID's (SP91).

After this, in order to create a fictional time required to remove the virus from the time required for virus checks in the immediate past, the virus infection state management program 32 generates a command (hereinafter referred to as a virtual virus check command) instructing to give notification of the time required for this virus check.

Figures 31, 32:
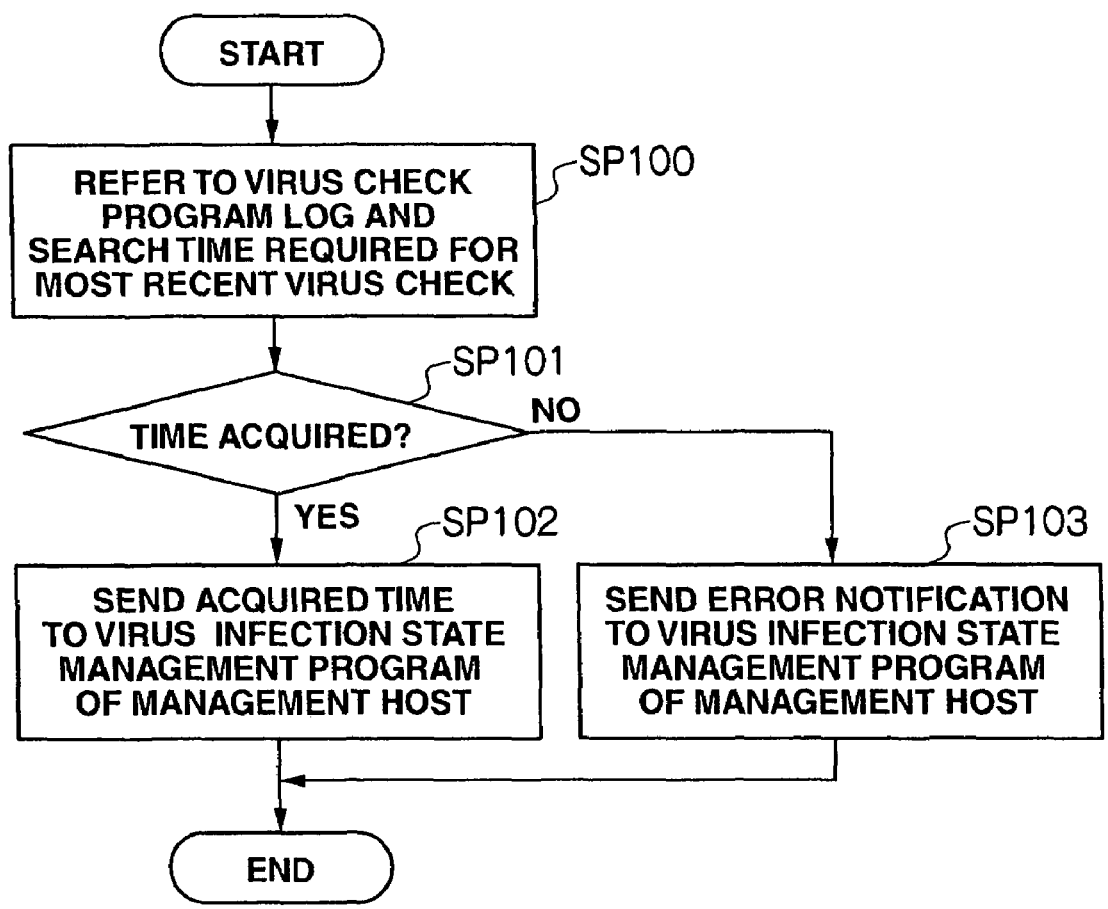
FIG. 31 is an outline view illustrating a virtual virus check command.
FIG. 32 is a flowchart illustrating virtual virus removal processing.

Specifically, as shown in FIG. 31, the virus infection state management program 32 generates a virtual virus check command set with "virtual virus check" as the type of command, the volume ID acquired in step SP90 as the volume ID of the primary volume PVOL taken as a target, and an apparatus ID acquired in step SP91 as the apparatus ID of the external storage apparatus 6 defined by the primary volume PVOL. The virus infection state management program 32 then sends this command to the operation hosts 3 of the host ID's acquired in step SP91 (SP92).

After this, the virus infection state management program 32 awaits notification of the time likely to be required in virus removal processing of the primary volume PVOL from the corresponding operation hosts 3 as described in the following according to this virtual virus check command (SP93).

When the time taken can be acquired, the virus infection state management program 32 sets the acquired time as the predicted virus removal time of the primary volume PVOL taken as a target (SP94). On the other hand, when the time taken cannot be acquired, the virus infection state management program 32 sets a predetermined time set in advance as the predicted virus removal time of the primary volume PVOL taken as a target (SP95).

Further, when a secondary volume SVOL exists for this primary volume PVOL, the virus infection state management program 32 sets the predicted virus removal time set for the primary volume PVOL as the predicted virus removal time for the for this secondary volume SVOL (SP96).

Next, the virus infection state management program 32 determines whether or not processing of all of the primary volumes PVOL infected with a virus within the storage system 1 is complete based on the infected volume cooperation state management table 33 (SP97). When a negative result is obtained, the same processing is repeated while changing the order of the primary volumes PVOL taken as a target after this (SP90 to SP97-SP90).

When an affirmative result is obtained in the determination of step SP97, the virus infection state management program 32 generates the virus infection state screen 40 containing the virus removal predicted results display section 50 (FIG. 22) reflecting the settings of step SP94 to step SP96, for display at the management host 2. After this, the virus infection state management program 32 ends the virus removal estimated results display processing.

Processing content for the virus infection state management program 23 of the operation host 3 receiving the virtual virus check command issued in step SP92 of the virus removal estimated results display processing is shown in FIG. 32.

When a virtual virus check command is supplied by the management host 2, the virus infection state management program 23 of the operation host 3 starts a virtual virus check and first searches for the time required for the most recent virus check from the log of the virus check program 20 (FIG. 1) (SP100). After this, the virus infection state management program 23 determines whether or not it is possible to acquire the required time using this search (SP101).

When an affirmative result is obtained in this determination, the virus infection state management program 23 sends the acquired time to the virus infection state management program 32 (SP102). On the other hand, when a negative result is obtained, after sending an error notification indicating that the time taken could not be acquired to the virus infection state management program 32 of the management host 2 (SP103), this virtual virus check processing is ended.

Figure 33:
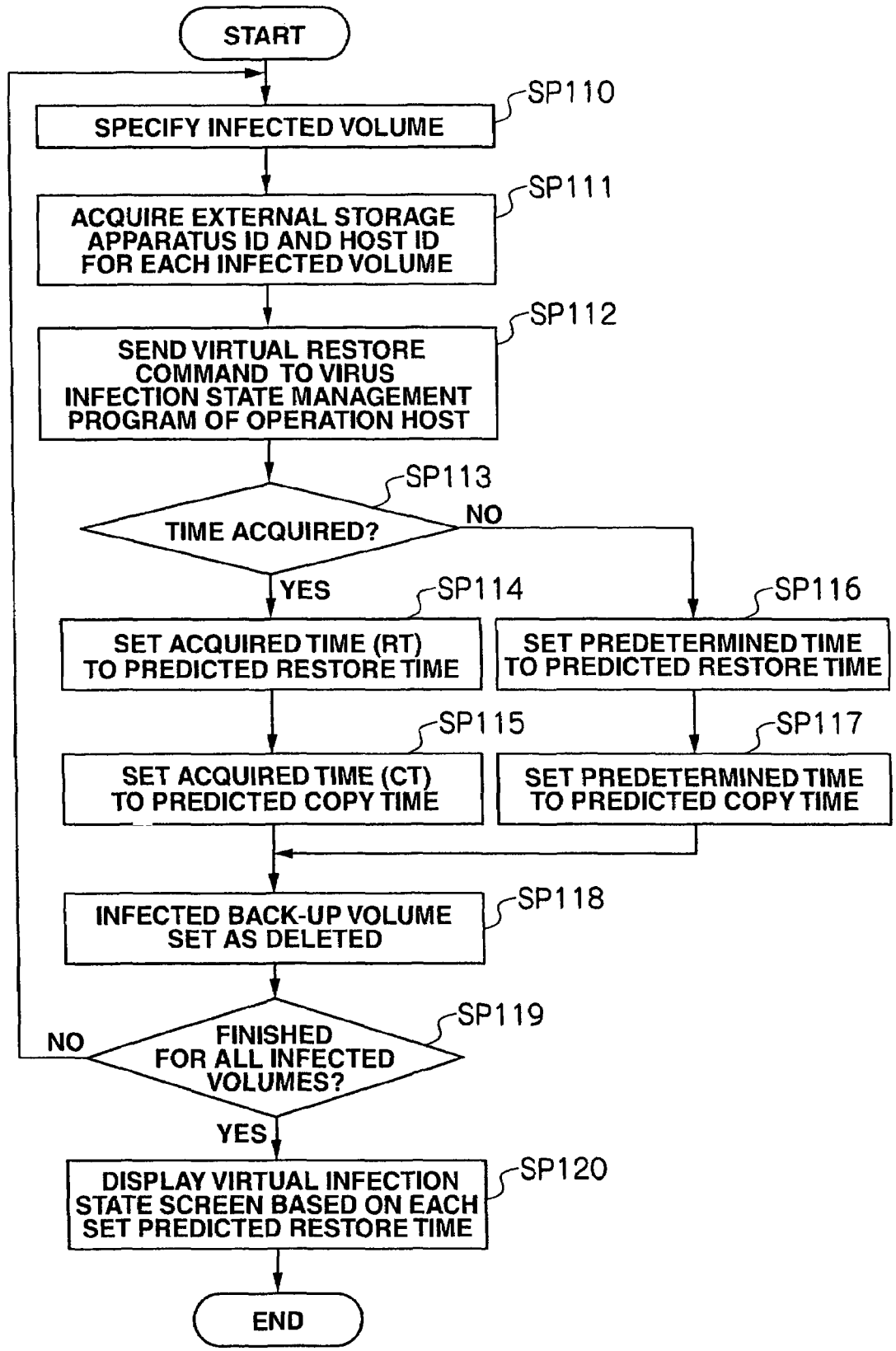
FIG. 33 is a flowchart illustrating virtual restore estimation results display processing.

On the other hand, when the second advance evaluation button 45 (FIG. 20) of the virus infection state screen 40 (FIG. 20) is clicked, the virus infection state management program 32 starts the virtual restore estimated results display processing shown in FIG. 33, and first specifies the primary volume infected with a virus within the storage system 1 based on the infected volume cooperation state management table 33 and acquires the ID of this volume (SP110).

The virus infection state management program 32 then acquires the apparatus ID of the external storage apparatus 6 set for the primary volume PVOL infected with the virus and the host ID's of operation hosts 3 using the primary volume PVOL based on the host-storage apparatus management table 34 (SP111).

Figures 34, 35:
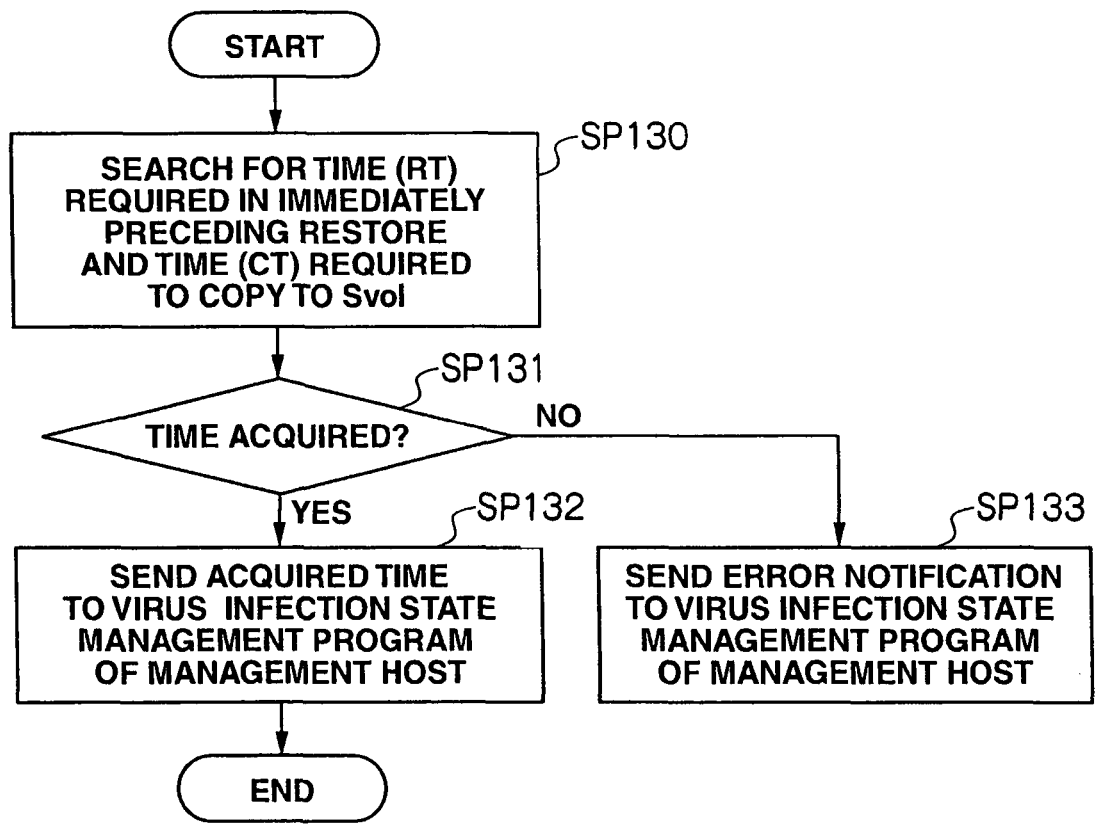
FIG. 34 is an outline view illustrating a virtual restore command.
FIG. 35 is a flowchart illustrating virtual restore processing.

After this, the virus infection state management program 32 generates a command (hereinafter referred to as a virtual restore command) instructing execution of a virtual restore process. Specifically, as shown in FIG. 34, a restore command is generated where "virtual restore" is set as the type of command, the volume ID acquired in step SP110 is set as the volume ID of the primary volume PVOL taken as a target, and an apparatus ID acquired in step SP111 is set as the apparatus ID of the external storage apparatus 6 defined by the primary volume PVOL. The virus infection state management program 32 then sends this command to the operation hosts 3 of the host ID's acquired in step SP111 (SP112).

The virus infection state management program 32 then awaits the time (hereinafter referred to as the "predicted required copying time") likely to be required to restore to the primary volume PVOL from the corresponding operation hosts 3 as described later according to the virtual restore command, and the time (hereinafter referred to as "predicted necessary copying time") required to copy restored data to the secondary volume SVOL (SP113).

When the predicted required restore time and the predicted required copying time are acquired, the virus infection state management program 32 sets the acquired predicted required restore time as the predicted restore time for the primary volume PVOL (SP114), and sets the acquired predicted required copying time as the predicted copying time for copying the restored data to the secondary volume SVOL (SP115).

On the other hand, when the predicted required restore time and the predicted required copying time cannot be acquired, the virus infection state management program 32 sets a predetermined time set in advance as the predicted restore time and the predicted copying time respectively (SP116, SP117).

Further, when a secondary volume SVOL infected with a virus exists as a secondary volume SVOL storing back up data for the primary volume PVOL, the virus infection state management program 32 sets this second volume SVOL to be deleted (SP118).

Next, the virus infection state management program 32 determines whether or not processing of all of the primary volumes PVOL infected with a virus within the storage system 1 is complete based on the infected volume cooperation state management table 33 (SP119). When a negative result is obtained, the same processing is repeated while changing the order of the primary volumes PVOL taken as a target after this (SP110 to SP119-SP110).

When an affirmative result is obtained in the determination of step SP119, the virus infection state management program 32 generates the virus infection state screen 40 containing the restore predicted results display section 51 (FIG. 23) reflecting the settings of step SP114 to step SP118, for display at the management host 2. After this, the virus infection state management program 32 ends the restore estimated results display processing.

Processing content for the virus infection state management program 23 of the operation host 3 receiving the virtual restore command issued in step SP112 of the restore estimated results display processing is shown in FIG. 35.

When a virtual restore command is supplied by the management host 2, first, the virus infection state management program 23 of the operation host 3 searches for the time required during the most recent restore and the time required for copying this restored data from the primary volume PVOL to the secondary volume SVOL from the log of the virus check program 20 (FIG. 1) (SP130). After this, the virus infection state management program 32 determines whether or not it is possible to acquire the required time using this search (SP131).

When an affirmative result is obtained in this determination, the virus infection state management program 23 sends the acquired times as the estimated required restore time and the estimated required copying time to the virus infection state management program 32 of the management host 2 (SP132). On the other hand, when a negative result is obtained, an error notification indicating that the estimated required restore time and the estimated required copying time could not be acquired is sent to the virus infection state management program 32 of the management host 2 (SP133) and the virtual restore processing then ends.

Figure 36:
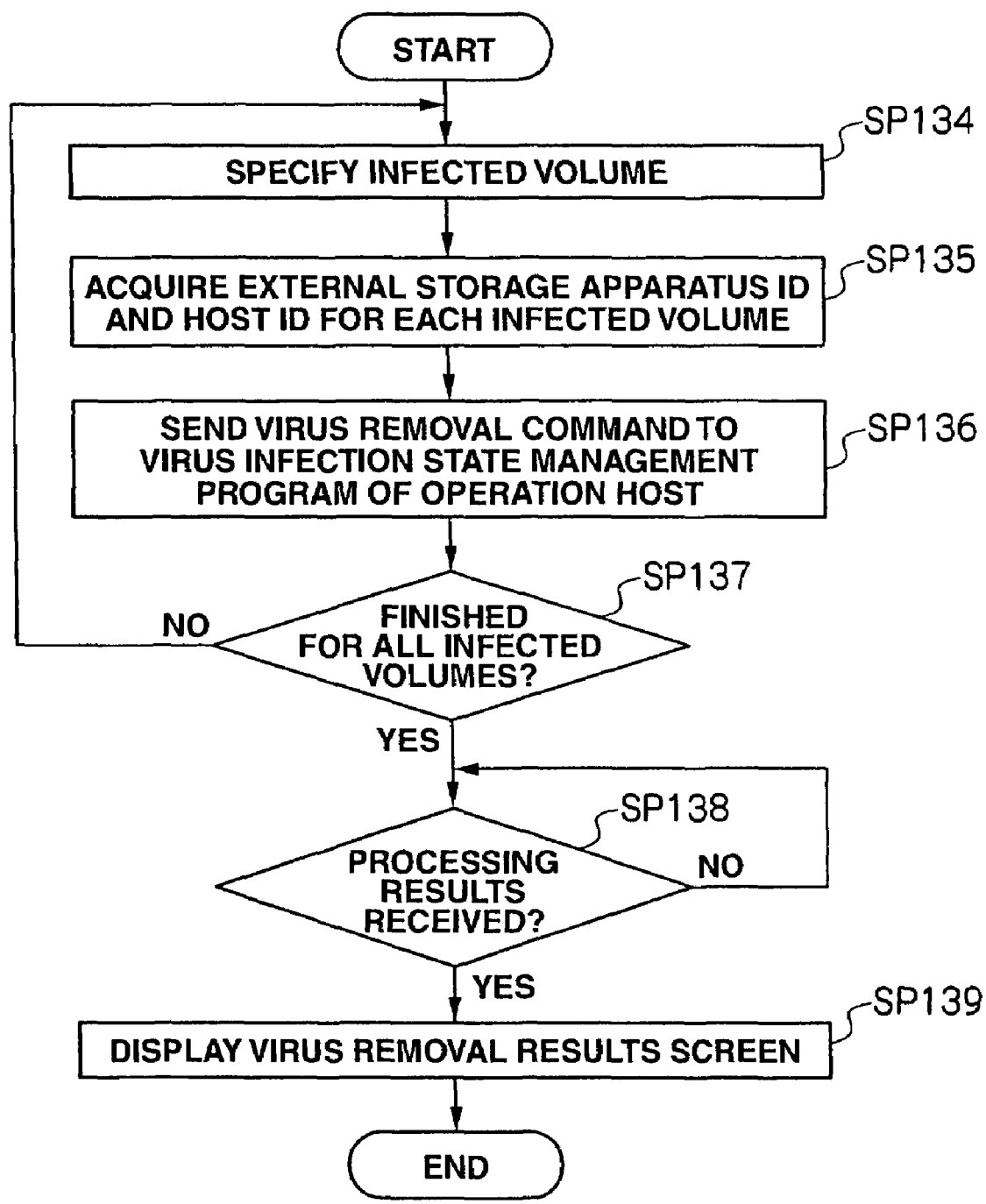
FIG. 36 is a flowchart illustrating virus removal processing.

(2-3-2-2) Specific Processing of the Virus Infection State Management Program for the Management Host Relating to Virus Removal On the other hand, when the first execute button 46 (FIG. 20) of the virus infection state screen 40 (FIG. 20) is clicked, the virus infection state management program 32 of the management host 2 executes the virus removal processing shown in FIG. 36.

Namely, when the first execute button 46 is clicked, the virus infection state management program 32 of the management host 2 starts this virus removal processing. As in step SP90 and step SP91 of the virus removal estimated results display processing described above in FIG. 30, the primary volume infected with a virus is then specified, and the volume ID, apparatus ID of the external storage apparatus 6 defined by the primary volume PVOL, and host ID for the operation host 3 using this primary volume PVOL are respectively obtained for the specified primary volume PVOL (step SP134, step SP135).

The virus infection state management program 32 then generates a command (hereinafter referred to as a "virus removal command") configured in the same manner as the virus check command (FIG. 31) with the exception of the instruction type being set to "virus removal", and transmits this command to the operation host 3 of the host ID acquired in step SP134 (SP136).

After this, the virus infection state management program 32 determines whether or not processing of all of the primary volumes PVOL infected with a virus within the storage system 1 is complete based on the infected volume cooperation state management table 33 (SP137). When a negative result is obtained, the same processing is repeated while changing the order of the primary volumes PVOL taken as a target after this (SP143 to SP137-SP134).

When an affirmative result it obtained in the determination of step SP137, the virus infection state management program 32 waits for processing results for the virus removal processing to be sent from all of the operation hosts 3 that the virus removal command was sent to (SP138). When processing results are received from all of the operation hosts 4, the virus removal results screen 60 described above in FIG. 25 is generated based on the processing results, and is displayed at the management host 2 (SP139). After this, the virus infection state management program 32 ends the virus removal processing.

Figure 37:
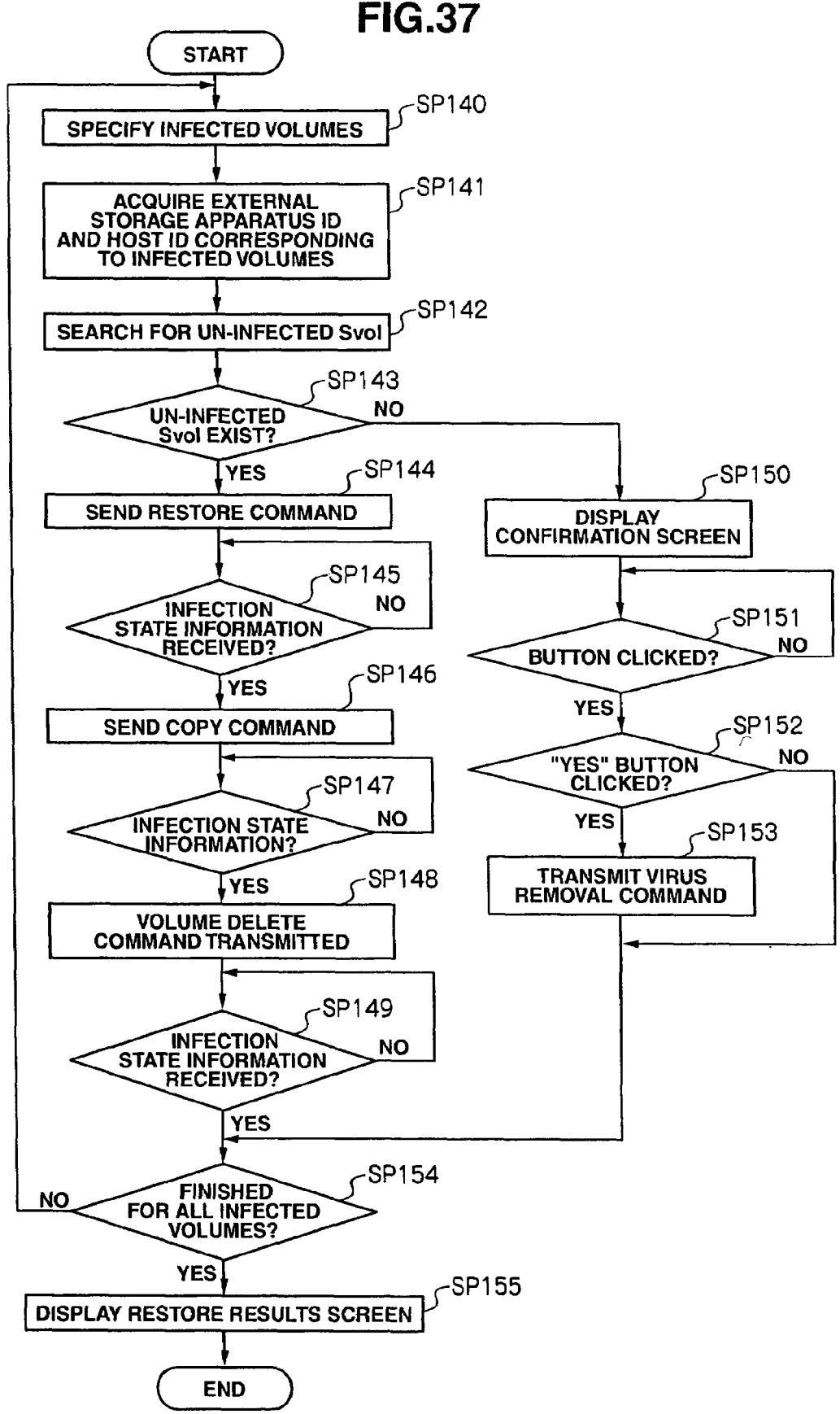
FIG. 37 is a flowchart illustrating restore processing.

On the other hand, when the second execute button 47 (FIG. 20) of the virus infection state screen 40 (FIG. 20) is clicked, the virus infection state management program 32 executes the restore processing shown in FIG. 37.

Namely, when the second execute button 47 is clicked, the virus infection state management program 32 starts the restore processing. As in step SP90 and step SP91 of the virus removal estimated results display processing described above in FIG. 30, the primary volume infected with a virus is then specified, and the volume ID, apparatus ID of the external storage apparatus 6 defined by the primary volume PVOL, and host ID for the operation host 3 using this primary volume PVOL are respectively obtained for the specified primary volume PVOL (step SP140, step SP141).

The virus infection state management program 32 then refers to the infected volume cooperation state management table 33 (FIG. 5), and determines whether or not a secondary volume SVOL that is not infected with a virus exists as a secondary volume SVOL for the primary volume PVOL taken as a target at this time (SP143).

When an affirmative result is obtained for this determination, the virus infection state management program 32 generates a command (hereinafter referred to as a restore command) instructing to restore the primary volume PVOL taken as a target.

Specifically, as shown in FIG. 38(A), the virus infection state management program 32 generates a restore command respectively set with "restore" as an instruction type, the apparatus ID acquired in step SP141 as an apparatus ID for the external storage apparatus 6 set for the volume VOL for the restore target, a volume ID for a primary volume PVOL taken as a target at this time taken as a volume ID for the primary volume VOL taken as a restore target, and a volume ID for the secondary volume SVOL recognized in step SP143 as a volume ID for the secondary volume SVOL storing data used during restoring. The virus infection state management program 32 then sends this command to the operation hosts 3 of the host ID's acquired in step SP141 (SP144).

After this, as described later, the virus infection state management program 32 awaits receipt of infected state information sent from the operation host 3 when the restore processing is complete for the primary volume PVOL (SP145).

When this infected state information is received, when a secondary volume SVOL that data for the primary volume PVOL taken as a target is to be copied to exists, the virus infection state management program 32 generates a command (hereinafter referred to as a "copy command") instructing copying to the corresponding secondary volume SVOL recognized in step SP143.

Specifically, as shown in FIG. 38(B), the virus infection state management program 32 generates a copy command set with "copy" as the type of command, the apparatus ID acquired in step SP141 as the apparatus ID of the external storage apparatus 6 the primary volume PVOL of the restore target is set to, the volume ID for the primary volume taken as a target at this time taken as the volume ID of the volume VOL taken as the copy source, and a volume ID for the secondary volume SVOL recognized in step S143 as the volume ID of the volume VOL of the copy destination. The virus infection state management program 32 then sends this command to the corresponding operation hosts 3 (SP146).

After this, as described later, when the copy processing is complete, the virus infection state management program 32 waits to receive infected state information sent from the operation host 3 (SP147).

Upon receiving this infected state information, the virus infection state management program 32 generates a command (hereinafter referred to as a "volume delete command") instructing to delete the secondary volume SVOL when a secondary volume SVOL to be deleted exists.

Specifically, as shown in FIG. 38(C), the virus infection state management program 32 generates a volume delete command respectively set with "delete" as an instruction type, and volume ID of the secondary volume SVOL as a volume ID for the volume that is the target of deletion. The virus infection state management program 32 then sends this command to the corresponding operation hosts 3 (SP148).

After this, as described later, when the volume delete processing is complete, the virus infection state management program 32 waits to receive infected state information sent from the operation host 3 (SP149).

Next, the virus infection state management program 32 determines whether or not processing of all of the primary volumes PVOL infected with a virus within the storage system 1 is complete based on the infected volume cooperation state management table 33 (SP154). When a negative result is obtained, the same processing is repeated while changing the order of the primary volumes PVOL taken as a target after this (SP140 to SP154-SP140).

When an affirmative result is obtained in the determination of step SP154, the virus infection state management program 32 generates the restore results screen 70 described above in FIG. 26 based on the results of the processing described above, and displays the restore results screen 70 at the management host 2 (SP155). After this, the virus infection state management program 32 ends the restore results display processing.

On the other hand, when a negative result is obtained in the determination of step SP143, the virus infection state management program 32 displays the confirmation screen 80 described above in FIG. 28 at the management host 2 (SP150).

The virus infection state management program 32 then waits for either of the "YES" button 81 or the "NO" button 82 of the confirmation screen 80 to be clicked (SP151).

When either of the "YES" button 81 and the "NO" button 82 is clicked, the virus infection state management program 32 determines whether or not the clicked button is the "YES" button 81 (SP152).

When a negative result is obtained in this determination, the virus infection state management program 32 proceeds to step SP154. On the other hand, when an affirmative result is obtained, in step SP141, regarding FIG. 31, the virus removal command described above is issued for the operation host 3 the host ID is acquired for in step SP141 (SP153). The virus infection state management program 32 then executes the same processing as in step SP140 to step SP154 and the restore result display processing then ends.

Figure 39:
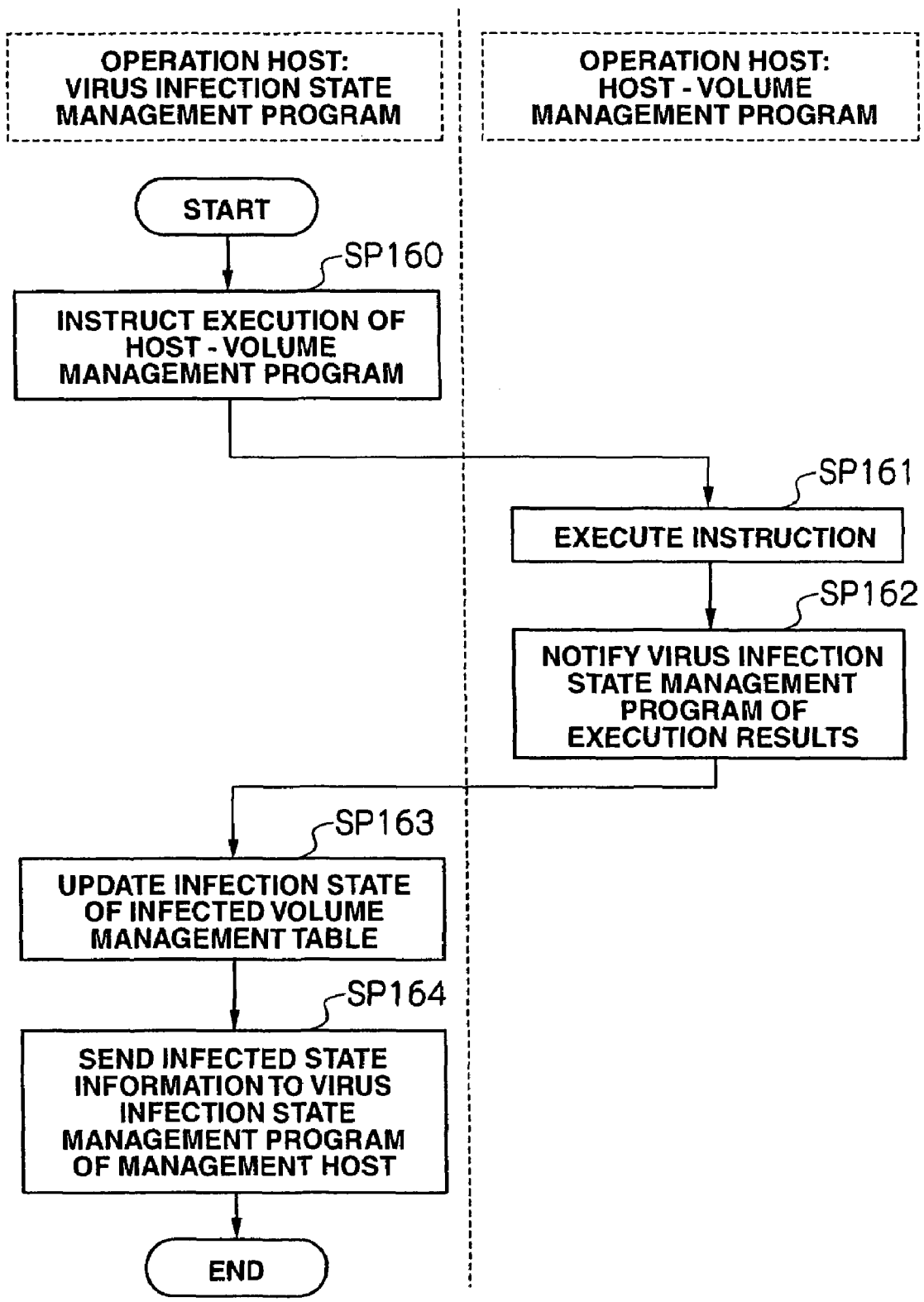
FIG. 39 is a flowchart illustrating processing content of a virus infection state management program and a host volume management program of an operation host receiving a restore command etc.

The processing content of the virus infection state management program 23 (FIG. 1) and the host-volume management program 20 (FIG. 1) of the operation host 3 receiving the restore command, copy command, and volume delete command is shown in FIG. 39.

Upon receiving the restore command, copy command, or volume delete command, the virus infection state management program 23 issues an instruction to execute processing designated in the restore command, copy command, or volume delete command to the host volume management program 20 (SP161).

The host-volume management program 20 receiving this instruction then executes restore processing for restoring the designated primary volume PVOL, copy processing for copying data of the designated primary volume PVOL to the designated secondary volume SVOL, or volume deletion processing for deleting the designated secondary volume SVOL in accordance with this instruction (SP161), and the virus infection state management program 23 is notified of the results of this execution (SP162).

The virus infection state management program 23 receiving this notification then updates the infected volume management table 25 (FIG. 4) in accordance with this notification (SP163) and then sends infected state information to the virus infection state management program 32 of the management host 2 based on the infected volume management table 25 after updating (SP164).

(2-3-2-3) Specific Processing Relating to Putting Paths Offline

Figure 40:
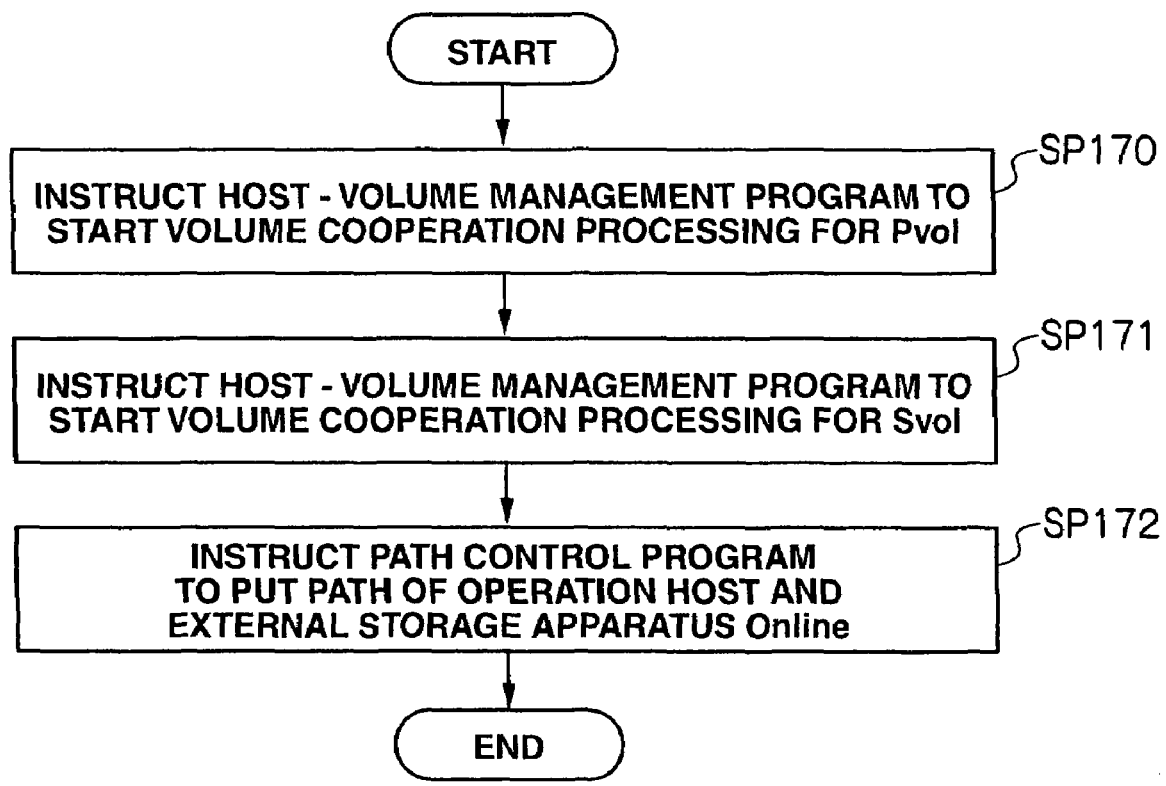
FIG. 40 is a flowchart illustrating path control processing.

On the other hand, when a put path offline button 62H, 72H of the virus removal results screen 60 (FIG. 24) or restore results screen 70 (FIG. 26) is clicked, the virus infection state management program 32 of the management host 2 executes the path offline processing shown in FIG. 40.

Namely, when a put path offline button 62H, 72H is clicked, the virus infection state management program 32 starts processing to put a path offline, and first searches the infected volume cooperation state management table 33 for a secondary volume SVOL with a cooperating relationship with the primary volume PVOL, for the primary volume PVOL corresponding to the entries check marks are displayed for in check boxes 62H, 72H at the host-storage apparatus management information display section 62 of the virus removal results screen 60 or the host-storage apparatus management information display section 72 of the restore results screen 70.

The virus infection state management program 32 then supplies an instruction (SP170) to the host-volume management program 30 (FIG. 1) in order to start cooperation with this secondary volume SVOL for the primary volume PVOL (SP170).

The host-volume management program 30 receiving this instruction then searches the host-storage apparatus management table 34 for external storage apparatus 6 set for this primary volume PVOL, and provides an instruction to execute processing relating to the primary volume PVOL in order to pair-connect the primary volume PVOL and the secondary volume SVOL, to the external storage apparatus 6.

Next, the virus infection state management program 32 provides an instruction to the host-volume management program 30 in such a manner as to start cooperative processing with the primary volume PVOL for the secondary volume SVOL (SP171).

The host-volume management program 30 receiving this instruction then searches the host-storage apparatus management table 34 for external storage apparatus 6 set for this secondary volume SVOL, and provides an instruction to execute processing relating to the secondary volume SVOL in order to pair-connect the primary volume PVOL and the secondary volume SVOL, to the external storage apparatus 6.

After this, the virus infection state management program 32 provides an instruction to the path control program 31 (FIG. 1) in order to put a path between the corresponding operation host 3 and the primary volume PVOL online (SP172).

The path control program 31 receiving this instruction the changes settings to put the corresponding path online in cooperation with the path control program 22 (FIG. 1) of the operation host 3.

(3) Effects of the Embodiment

As described above, with the storage system of this embodiment, the operation host 3 periodically or irregularly checks for the presence or absence of a virus infection at the volumes VOL within the external storage apparatus 6, specifies a range of influence of a virus infection when a virus infection is detected, and puts paths between the required volumes VOL and operation host(s) 3 within this region of influence offline and cooperative operation of the volumes VOL infected with a virus and other volumes VOL is halted. It is therefore possible to implement a virus infection spreading prevention operation in an extremely straightforward manner while effectively and reliably preventing the spreading of virus infection.

Further, at the storage system 1, the range of influence of the virus infection is displayed on a screen as described above, and virus removal results resulting from virus removal or restoring are displayed on a screen according to external operation. It is therefore possible for a system administrator to easily recognize which of the methods of virus removal or restoring is the more appropriate method, and it is possible to support a virus removal operation where virus removal can be carried out using a more appropriate virus removal method.

(4) Further Embodiment

In the embodiment described above, a description is given of the case of applying the present invention to the storage system 1 configured as shown in FIG. 1 but the present invention is by no means limited in this respect and may also be broadly applied to various forms of storage system.

In the above embodiment, a description is given where, at the operation host 3, a program compatible with the CPU 12 controlling the operation of all of the operation hosts 3 is constituted by a virus check section executing virus checks on the primary volumes PVOL periodically or irregularly, and the first virus infection state management section sending infection state information to the management host 2 according to detection results when the virus check section detects a virus infection for a primary volume PVOL but the present invention is by no means limited in this respect, and these may also be configured from dedicated processors and compatible programs.

Moreover, in the above embodiments, a description is given where at the management host 2, a second virus infection state management section executing predetermined processing for putting the states of paths with a primary volume PVOL infected with a virus based on infection state information when infection state information is received from an operation host 3, and a second virus infection state management section specifying the extent of influence of a virus infection when infected state information is received from an operation host based on cooperation information and correlation information, predicting a state after removal of a virus from the necessary volumes existing within the range of influence, and displaying the results of the prediction on a screen based on the prediction results constitute a program compatible with CPU 10 performing the overall control of the management host 2 but the present invention is by no means limited in the respect, and configuration using a dedicated processor and compatible program is also possible.

Further, in the embodiment described above, a description is given of the case where memory 11 is applied as the storage holding section storing cooperation information that is information relating to cooperation between volumes and correlation information that is information relating to correlation between the operation hosts 3 and the volumes at the management host 2 but in addition to semiconductor memory, disc storage media such as hard discs or optical discs etc. and other storage media may also be broadly applied as this memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system having an operation host, external storage apparatus providing volumes having storage regions for data to the operation host, and a management host for managing the operation host and the external storage apparatus, the operation host comprising:
   a virus check section executing virus checks on the volumes periodically or irregularly; and
   a first virus infected state management section for sending infected state information to the management host according to results of detection when the virus check section detects that the volume is infected with a virus, and the management host comprising:
   a second virus infected state management section executing predetermined processing to put the state of a path with the volume infected with a virus offline based on infected state information when the infected state information is received from the operation host, wherein the management host holds related information that is information relating to correlation between the operation host and the volume, and the second virus infected state management section determines whether or not another operation host other than the operation host is using the volume infected with a virus when the infected state information is received from the operation host, and executes predetermined processing to put the state of a path between the another operation host and the volume infected with a virus offline when the another operation host is present.

2. The storage system according to claim 1, wherein the virus check section has a function taken as a virus removal tool for removing viruses from volumes infected with a virus, the management host holds cooperation information that is information relating to cooperation between the volumes, and correlation information that is information relating to correlation between operation hosts and the volumes, and the second virus infected state management section specifies a range of influence of a virus infection based on the cooperation information and the correlation information according to the first operation input from outside and executes virus removal processing for necessary volumes existing within the range of influence at the virus check section of the operation host(s).

3. The storage system according to claim 1, wherein the virus check section has a function for carrying out control in order to restore the volume, the management host holds cooperation information that is information relating to cooperation between the volumes, and correlation information that is information relating to correlation between operation hosts and the volumes, and the second virus infected state management section specifies a range of influence of a virus infection based on the cooperation information and the correlation information according to the first operation input from outside and executes virus restore processing for restoring necessary volumes existing within the range of influence at the virus check section of the operation host(s).

4. A virus infection spreading prevention method for a storage system having an operation host, external storage apparatus providing volumes having storage regions for data to the operation host, and a management host for managing the operation host and the external storage apparatus, comprising:

a first step of executing a virus check on the volume periodically or irregularly at the operation host;

a second step of sending infected state information to the management host according to results of detection when a virus infection is detected for the volume at the operation host; and a third step of executing predetermined processing in order to put the state of a path with the volume infected with a virus offline based on the infected state information at the management host, wherein the management host holds related information that is information relating to correlation between the operation host and the volume, and wherein the third step determines whether or not another operation host other than the operation host is using the volume infected with a virus at the management host, and executes predetermined processing to put the state of a path between the another operation host and the volume infected with a virus offline when the another operation host is present.

5. The virus infection spreading prevention method of claim 4, wherein the operation host has a function taken as a virus removal tool for removing viruses from volumes infected with a virus, and wherein the management host holds cooperation information that is information relating to cooperation between the volumes, and correlation information that is information relating to correlation between operation hosts and the volumes, and further comprising a fourth step of specifying a range of influence of a virus infection based on the cooperation information and the correlation information according to the first operation input from outside and executing virus removal processing for necessary volumes existing within the range of influence at the virus check section of the operation host(s).

6. The virus infection spreading prevention method of claim 4, wherein the operation host has a function for carrying out control in order to restore the volume to a past state, and wherein the management host holds cooperation information that is information relating to cooperation between the volumes, and correlation information that is information relating to correlation between operation hosts and the volumes, and further comprising a fourth step of specifying a range of influence of a virus infection based on the cooperation information and the correlation information according to the first operation input from outside and executing virus restore processing for restoring necessary volumes existing within the range of influence at the virus check section of the operation host(s).

7. A storage system having an operation host, external storage apparatus providing volumes having storage regions for data to the operation host, and a management host for managing the operation host and the external storage apparatus, the operation host comprising:
a virus check section executing virus checks on the volumes periodically or irregularly; and
a first virus infected state management section for sending infected state information to the management host according to results of detection when the virus check section detects that the volume is infected with a virus, and the management host comprising:
a second virus infected state management section executing predetermined processing to put the state of a path with the volume infected with a virus offline based on infected state information when the infected state information is received from the operation host, wherein the virus check section comprises a virus removal function taken as a virus removal tool for removing viruses from volumes infected with a virus, and a restore control function for carrying out control in order to restore a volume to a past state, and wherein the second virus infected state management section displays select buttons on a state screen for selecting whether to carry out removal using a method of either a first method utilizing the virus removal function of the virus check section or a second method utilizing the restore control function of the virus check section on a predicted results screen.

8. A virus removal support method for a storage system having an operation host, external storage apparatus providing volumes having storage regions for data to the operation host, and a management host for managing the operation host and the external storage apparatus, comprising:

a first step of executing a virus check on the volume periodically or irregularly at the operation host;

a second step of sending infected state information to the management host according to results of detection when a virus infection is detected for the volume at the operation host; and a third step of, at the management host, when the infected state information is received from the operation host, specifying a range of influence of a virus infection based on cooperation information that is information relating to cooperation between the volumes held in storage in advance, predicting a state after removal of the virus from the necessary volumes existing within the range of influence, and displaying predicted results on a screen based on the predicted results, wherein the operation host comprises a virus removal function taken as a virus removal tool for removing viruses from volumes infected with a virus, and a restore control function for carrying out control in order to restore a volume to a past state, and wherein the third step displays select buttons on a state screen for selecting whether to carry out removal using a method of either a first method utilizing the virus removal function of the virus check section or a second method utilizing the restore control function of the virus check section on a predicted results screen.

* * * * *